United States Patent
Zhang et al.

(10) Patent No.: US 11,345,802 B2
(45) Date of Patent: *May 31, 2022

(54) THERMOPLASTIC POLYOLEFIN COMPOSITIONS USEFUL FOR ALDEHYDE ABATEMENT

(71) Applicant: Dow Global Technologies LLC, Midland, MI (US)

(72) Inventors: Yahong Zhang, Shanghai (CN); Tao Wang, Shanghai (CN); Jian Zou, Shanghai (CN)

(73) Assignee: Dow Global Technologies LLC, Midland, MI (US)

(*) Notice: Subject to any disclaimer, the term of this patent is extended or adjusted under 35 U.S.C. 154(b) by 221 days.

This patent is subject to a terminal disclaimer.

(21) Appl. No.: 16/617,274

(22) PCT Filed: May 22, 2018

(86) PCT No.: PCT/US2018/033915
§ 371 (c)(1),
(2) Date: Nov. 26, 2019

(87) PCT Pub. No.: WO2018/222445
PCT Pub. Date: Dec. 6, 2018

(65) Prior Publication Data
US 2020/0165427 A1 May 28, 2020

(30) Foreign Application Priority Data

May 29, 2017 (WO) ............... PCT/CN2017/086487

(51) Int. Cl.
| | | |
|---|---|---|
| *C08L 23/14* | (2006.01) | |
| *C08F 212/08* | (2006.01) | |
| *C08F 257/02* | (2006.01) | |
| *C08L 29/12* | (2006.01) | |
| *C08L 33/04* | (2006.01) | |

(52) U.S. Cl.
CPC ............ *C08L 23/14* (2013.01); *C08F 212/08* (2013.01); *C08F 257/02* (2013.01); *C08L 29/12* (2013.01); *C08L 33/04* (2013.01); *C08L 2205/035* (2013.01); *C08L 2205/08* (2013.01); *C08L 2207/04* (2013.01)

(58) Field of Classification Search
None
See application file for complete search history.

(56) References Cited

U.S. PATENT DOCUMENTS

| | | | |
|---|---|---|---|
| 6,586,516 B1 | 7/2003 | Kesselmayer et al. | |
| 8,609,762 B2 | 12/2013 | Killilea | |
| 11,078,353 B2* | 8/2021 | Zhang | ............... C08L 23/14 |
| 2003/0195299 A1* | 10/2003 | Stevens | ............... C08F 10/00 |
| | | | 525/240 |
| 2011/0160368 A1 | 6/2011 | Bohling et al. | |
| 2011/0272621 A1* | 11/2011 | Jaffrennou | ............... C08G 8/28 |
| | | | 252/62 |
| 2012/0208963 A1 | 8/2012 | Van Rheenen et al. | |
| 2012/0245267 A1* | 9/2012 | Blanchard | ............... C09D 7/41 |
| | | | 524/218 |

FOREIGN PATENT DOCUMENTS

| | | |
|---|---|---|
| CN | 1840576 A | 10/2006 |
| CN | 101570612 B | 5/2011 |
| CN | 101691435 B | 11/2011 |
| CN | 102757597 A | 10/2012 |
| CN | 101469094 B | 12/2012 |
| CN | 103044771 A | 4/2013 |
| CN | 103059409 A | 4/2013 |
| CN | 103113662 A | 5/2013 |
| CN | 103254499 A | 8/2013 |
| CN | 103571054 A | 2/2014 |
| CN | 103589048 A | 2/2014 |
| CN | 103589072 A | 2/2014 |
| CN | 102432977 B | 4/2014 |
| CN | 103788471 A | 5/2014 |
| CN | 104302718 A | 1/2015 |
| CN | 106543422 A | 3/2017 |
| EP | 2284219 A1 | 2/2011 |
| WO | 2013148035 A1 | 10/2013 |
| WO | WO-2014191573 A1 * | 12/2014 ........... C09D 133/14 |
| WO | 2016166072 A1 | 10/2016 |

OTHER PUBLICATIONS

Lin, Y. et al., "Comparison of Olefin Copolymers as Compatibilizers for Polypropylene and High-Density Polyethylene". Journal of Applied Polymer Science 2009, 113(3), 1945-1952. (Year: 2009).*
Kang, P. et al., "Formation and Emissions of Volatile Organic Compounds from Homo-PP and Co-PP Resins during Manufacturing Process and Accelerated Photoaging Degradation". Molecules 2020, 25, 2761, 1-21. (Year: 2020).*
PCT/CN2017/086487, International Search Report and Written Opinion dated Mar. 7, 2018.
PCT/US2018/033915, International Search Report and Written Opinion dated Sep. 20, 2018.

* cited by examiner

*Primary Examiner* — Richard A Huhn

(57) ABSTRACT

The present disclosure provides a composition comprising: (A) a polypropylene polymer; (B) a polyolefin elastomer; (C) a polymer comprising an acetoacetyl functional group; and (D) a compatibilizer component. The present disclosure also provides an article made from the composition.

15 Claims, No Drawings

THERMOPLASTIC POLYOLEFIN COMPOSITIONS USEFUL FOR ALDEHYDE ABATEMENT

BACKGROUND

The present disclosure relates to thermoplastic polyolefin compositions useful for aldehyde abatement.

Automobile interior parts are typically made of thermoplastic polyolefin (TPO) compositions, such as TPO compositions containing polyolefin elastomer (POE). Increasing pressures and consumer concerns on car interior air quality have led to government regulations that limit the concentration of volatile organic compounds (VOCs), such as aldehydes, permissible in automobile interior parts. For example, certain government regulations have been recently implemented which limit the concentration of aldehydes in automobile interior parts to less than 0.10 mg/m$^3$ formaldehyde, less than 0.05 mg/m$^3$ acetaldehyde, and less than 0.05 mg/m$^3$ acrolein.

A need exists for a thermoplastic polyolefin composition useful for aldehyde abatement. A need also exists for an aldehyde abatement thermoplastic polyolefin composition that significantly reduces aldehydes, maintains the balance of mechanical properties important for automobile interior parts, such as sufficient toughness and stiffness, and is cost-effective.

SUMMARY OF THE INVENTION

In certain embodiments, the present disclosure provides a composition comprising:
 (A) a polypropylene polymer;
 (B) a polyolefin elastomer;
 (C) a polymer comprising an acetoacetyl functional group; and
 (D) a compatibilizer component.

Optionally, in certain embodiments, the composition of the present disclosure may further comprise (E) an additive component.

In certain embodiments, the present disclosure provides a composition comprising:
 (A) from 50 wt % to 85 wt % of a polypropylene polymer;
 (B) from 5 wt % to 35 wt % of a polyolefin elastomer;
 (C) from 0.2 wt % to 20 wt % of a polymer comprising an acetoacetyl functional group;
 (D) from 0.01 wt % to 10 wt % of a compatibilizer component; and
 (E) from 0 wt % to 30 wt % of an additive component.

In certain embodiments, the present disclosure provides an article made from a composition comprising:
 (A) a polypropylene polymer;
 (B) a polyolefin elastomer;
 (C) a polymer comprising an acetoacetyl functional group; and
 (D) a compatibilizer component.

Optionally, in certain embodiments, an article made from the composition of the present disclosure may further comprise (E) an additive component.

DETAILED DESCRIPTION

Definitions

For purposes of United States patent practice, the contents of any referenced patent, patent application or publication are incorporated by reference in their entirety (or its equivalent U.S. version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value, as well as decimal values. For ranges containing explicit values (e.g., 1 to 7), any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

An "elastomer" is a polymer that experiences large reversible deformations under relatively low stress. Elastomers can either be thermoplastic or thermoset. "Thermoplastic elastomers" are elastomers having thermoplastic properties. That is, thermoplastic elastomers are optionally molded or otherwise shaped and reprocessed at temperatures above their melting or softening point. The polyolefin elastomers suitable for use herein are thermoplastic elastomers.

An "ethylene-based polymer," "ethylene polymer," or "polyethylene" is a polymer that contains equal to or greater than 50 wt %, or a majority amount of, polymerized ethylene monomer (based on the total weight of the polymer) and, optionally, may contain at least one comonomer. The generic term "polyethylene" thus includes polyethylene homopolymer and polyethylene interpolymer.

An "ethylene/α-olefin polymer" is a polymer that contains equal to or greater than 50 wt %, or a majority amount of, polymerized ethylene, based on the weight of the polymer, and one or more α-olefin comonomers.

A "homopolymer" is a polymer comprising repeating units derived from a single monomer type, but does not exclude residual amounts of other components used in preparing the homopolymer, such as chain transfer agents.

"Olefin polymer," "olefinic polymer," "olefinic interpolymer," "polyolefin" and like terms refer to a polymer derived from simple olefins. A "polyolefin" contains equal to or greater than 50 wt %, or a majority amount of, polymerized olefin monomer (based on the total weight of the polymer) and, optionally, may contain at least one comonomer. Non-limiting examples of α-olefin monomer include $C_2$, or $C_3$ to $C_4$, or $C_6$, or $C_8$, or $C_{10}$, or $C_{12}$, or $C_{16}$, or $C_{18}$, or $C_{20}$ α-olefins, such as ethylene, propylene, 1-butene, 1-hexene, 4-methyl-1-pentene, and 1-octene. Representative polyolefins include polyethylene, polypropylene, polybutene, polyisoprene, and their various interpolymers.

A "polymer" is a compound prepared by polymerizing monomers, whether of the same or a different type, that in polymerized form provide the multiple and/or repeating "units" or "mer units" that make up a polymer. "Polymer" includes homopolymers, copolymers, terpolymers, interpolymers, and so on. "Polymer" also embraces all forms of copolymer, e.g., random, block, etc. An "interpolymer" is a polymer prepared by the polymerization of at least two types of monomers or comonomers. "Interpolymer" includes, but is not limited to, copolymers (which usually refers to polymers prepared from two different types of monomers or comonomers), terpolymers (which usually refers to polymers prepared from three different types of monomers or comonomers), tetrapolymers (which usually refers to polymers prepared from four different types of monomers or comonomers), and the like. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to as being based on "units" that are the polymerized form of a corresponding monomer.

A "polypropylene polymer," "propylene-based polymer," or "propylene polymer," is a polymer that contains equal to or greater than 50 wt %, or a majority amount of, polymerized propylene monomer (based on the total weight of the polymer) and, optionally, may contain at least one comonomer. The generic term "polypropylene" thus includes propylene homopolymer, propylene interpolymer, a blend of two or more propylene homopolymers, a blend of two or more propylene interpolymers, and a blend of one or more propylene homopolymers with one or more propylene interpolymers.

"Polystyrene" is an aromatic polymer prepared from styrene monomer as the only type of monomer. Thus, polystyrene is a styrene homopolymer. The generic term "polystyrene" includes impact modified polystyrene.

A "styrenic block copolymer" is an elastomer having at least one block segment of a styrenic monomer in combination with another block segment of another comonomer. The structure of the styrene block copolymers can be of the linear or radial type, and of the diblock or triblock type. Styrenic block copolymers are available from Dexco Polymers under the trademark VECTOR, from Kraton Corporation under the trademark KRATON, and from Dynasol under the trademark SOLPRENE.

A "thermoplastic" material is a linear or branched polymer which can be repeatedly softened and made flowable when heated and returned to a hard state when cooled to room temperature. In addition, thermoplastics can be molded or extruded into articles of any predetermined shape when heated to the softened state.

(A) Polypropylene Polymer

The present composition comprises a polypropylene polymer. In certain embodiments, the present composition comprises from 50 wt % to 85 wt % (e.g., from 50 wt % to 80 wt %, from 55 wt % to 75 wt %, from 55 wt % to 70 wt %, from 59 wt % to 65 wt %, and/or from 59 wt % to 63 wt %) of a polypropylene polymer, based on the total weight of the composition. Said in another way, in certain embodiments, the composition comprises from 50 wt %, or 55 wt %, or 59 wt %, or 60 wt % to 62 wt %, or 63 wt %, or 65 wt %, or 70 wt %, or 75 wt %, or 80 wt %, or 85 wt % of a polypropylene polymer, based on the total weight of the composition.

In certain embodiments, the polypropylene polymer contains from greater than 50 wt %, or 60 wt %, or 70 wt %, or 75 wt % to 80 wt %, or 90 wt %, or 95 wt %, or 98 wt %, or 99 wt %, or 100 wt % polymerized propylene monomer, based on the total weight of the polymer. The remainder of the polypropylene polymer is derived from units of ethylene and/or an α-olefin having from 4, or 6 to 8, or 12, or 16, or 20 carbon atoms. In an embodiment, the α-olefin is a $C_4$-$C_{20}$ linear, branched, or cyclic α-olefin.

Nonlimiting examples of suitable polypropylene polymers include polypropylene homopolymer (such as Braskem™ Polypropylene H502-25RZ); polypropylene random copolymer (such as Braskem™ Polypropylene R751-12N); polypropylene impact copolymer (such as YUPLENE™ BX3900 available from SK Global Chemical, and Braskem™ Polypropylene T702-12N); graft polypropylene copolymers; and block propylene copolymers (such as polypropylene olefin block copolymers (PP-OBC) available from The Dow Chemical Company).

In various embodiments, the polypropylene polymer is a polypropylene impact copolymer.

In various embodiments, the polypropylene polymer has a density from 0.890 to 0.920 g/cm$^3$ (e.g., from 0.890 to 0.915 g/cm$^3$, from 0.890 to 0.910 g/cm$^3$, from 0.895 to 0.905 g/cm$^3$, etc.) in accordance with ASTM D792. Said in another way, in various embodiments, the polypropylene polymer has a density from 0.890 g/cm$^3$, or 0.895 g/cm$^3$, or 0.900 g/cm$^3$ to 0.905 g/cm$^3$, or 0.910 g/cm$^3$, or 0.915 g/cm$^3$, or 0.920 g/cm$^3$ in accordance with ASTM D792.

In various embodiments, the polypropylene polymer has a melt flow rate from 30 g/10 min to 100 g/10 min (e.g., from 40 to 90 g/10 min, from 45 to 80 g/10 min, from 50 to 70 g/10 min, from 55 to 65 g/10 min, etc.) in accordance with ASTM D1238 (230° C./2.16 kg). Said in another way, in various embodiments, the polypropylene polymer has a melt flow rate from 30 g/10 min, or 40 g/10 min, or 50 g/10 min, or 55 g/10 min, or 60 g/10 min to 65 g/10 min, or 70 g/10 min, or 80 g/10 min, or 90 g/10 min, or 100 g/10 min (ASTM D1238, 230° C./2.16 kg).

Polypropylene suitable for use herein can have one, some, or all of the following properties:

(a) a density from 0.890 g/cm$^3$, or 0.895 g/cm$^3$, or 0.900 g/cm$^3$ to 0.905 g/cm$^3$, or 0.910 g/cm$^3$, or 0.915 g/cm$^3$, or 0.920 g/cm$^3$ in accordance with ASTM D792; and/or (b) a melt flow rate from 50 g/10 min, or 55 g/10 min, or 60 g/10 min to 65 g/10 min, or 70 g/10 min, or 80 g/10 min, or 90 g/10 min, or 100 g/10 min in accordance with ASTM D1238 (230° C./2.16 kg).

In one or more embodiments, the polypropylene polymer is a polypropylene impact copolymer with a density of 0.90 g/cm$^3$ (ASTM D792) and a melt flow rate of 60 g/10 min (ASTM D1238, 230° C./2.16 kg).

The polypropylene polymer may comprise one or more embodiments disclosed herein.

(B) Polyolefin Elastomer

The present composition comprises a polyolefin elastomer. In certain embodiments, the present composition comprises from 5 wt % to 35 wt % (e.g., from 10 wt % to 35 wt %, from 15 wt % to 30 wt %, from 15 wt % to 25 wt %, from 19 wt % to 25 wt %, from 19 wt % to 23 wt %, and/or from 19 wt % to 21 wt %) of a polyolefin elastomer, based on the total weight of the composition. Said in another way, in certain embodiments, the composition comprises from 5 wt %, or 10 wt %, or 15 wt %, or 19 wt %, or 20 wt % to 21 wt %, or 23 wt %, or 25 wt %, or 30 wt %, or 35 wt % of a polyolefin elastomer, based on the total weight of the composition.

In certain embodiments, the polyolefin elastomer of the present composition is a polyolefin elastomer or a mixture of polyolefin elastomers. A "polyolefin elastomer" is an elastomeric polymer containing at least 50 mole percent (mol %) of units derived from one or more α-olefins (based on the total amount of polymerizable monomers), or that contains equal to or greater than 50 wt %, or a majority amount of, polymerized α-olefin monomer (based on the total weight of the elastomer). In various embodiments, the polyolefin elastomers consist of only polymerized α-olefin monomer, including ethylene. Such polyolefin elastomers can be either homopolymers or interpolymers. Examples of polyolefin homopolymers are homopolymers of ethylene or propylene. Examples of polyolefin interpolymers are ethylene/α-olefin interpolymers and propylene/α-olefin interpolymers. In such embodiments, the α-olefin can be a $C_{3-20}$ linear, branched or cyclic α-olefin (for the propylene/α-olefin interpolymers, ethylene is considered an α-olefin). Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also contain a cyclic structure such as cyclohexane or cyclopentane, resulting in an α-olefin such as 3-cyclohexyl-1-propene (allyl cyclohexane) and vinyl cyclohexane. Illustrative polyolefin copolymers include ethylene/propylene, ethylene/butene, ethylene/1-hexene, ethylene/1-octene, and the like. Illustrative terpolymers include ethylene/propylene/1-octene, ethylene/propylene/butene, and ethylene/butene/1-octene. In an embodiment, the polyolefin elastomer is an ethylene/octene copolymer. Additionally, the copolymers can be random or blocky.

Polyolefin elastomers can also comprise one or more functional groups such as an unsaturated ester or acid or silane, and these elastomers (polyolefins) are well known and can be prepared by conventional high-pressure techniques. The unsaturated esters can be alkyl acrylates, alkyl methacrylates, or vinyl carboxylates. The alkyl groups can have 1 to 8 carbon atoms and preferably have 1 to 4 carbon atoms. The carboxylate groups can have 2 to 8 carbon atoms and preferably have 2 to 5 carbon atoms. The portion of the copolymer attributed to the ester comonomer can be in the range of 1 up to 50 percent by weight based on the weight of the copolymer. Examples of the acrylates and methacrylates are ethyl acrylate, methyl acrylate, methyl methacrylate, t-butyl acrylate, n-butyl acrylate, n-butyl methacrylate, and 2-ethylhexyl acrylate. Examples of the vinyl carboxylates are vinyl acetate, vinyl propionate, and vinyl butanoate. Examples of the unsaturated acids include acrylic acids or maleic acids. One example of an unsaturated silane is vinyl trialkoxysilane.

Functional groups can also be included in the polyolefin elastomer through grafting which can be accomplished as is commonly known in the art. In certain embodiments, grafting may occur by way of free radical functionalization which typically includes melt blending the polyolefin elastomer, a free radical initiator (such as a peroxide or the like), and a compound containing a functional group. During melt blending, the free radical initiator reacts (reactive melt blending) with the polyolefin elastomer to form polymer radicals. The compound containing a functional group bonds to the backbone of the polymer radicals to form a functionalized polymer. Exemplary compounds containing functional groups include but are not limited to alkoxysilanes (e.g., vinyl trimethoxysilane, vinyl triethoxysilane) and vinyl carboxylic acids and anhydrides (e.g., maleic anhydride).

Commercial examples of polyolefin elastomers useful herein include very-low-density polyethylene (VLDPE) (e.g., FLEXOMER™ ethylene/1-hexene polyethylene made by The Dow Chemical Company); homogeneously branched, linear ethylene/α-olefin copolymers (e.g. TAFMER™ by Mitsui Petrochemicals Company Limited and EXACT™ by Exxon Chemical Company); homogeneously branched, substantially linear ethylene/α-olefin copolymers (e.g., AFFINITY™ and ENGAGE™ available from The Dow Chemical Company); amorphous polyolefins (APOs) (e.g., EASTOFLEX™ amorphous propylene homopolymer available from Eastman Chemical Company); olefin block copolymers (e.g., INFUSE™ and INTUNE™ olefin block copolymers available from The Dow Chemical Company); and combinations thereof. In various embodiments, the polyolefin elastomers are the homogeneously branched linear and substantially linear ethylene/α-olefin copolymers. The substantially linear ethylene copolymers are more fully described in U.S. Pat. Nos. 5,272,236; 5,278,272 and 5,986,028. In another embodiment, the polyolefin elastomers are amorphous polyolefins, such as those more fully described in US Pub. No. 2004/0081795.

The polyolefin elastomers useful herein also include propylene-, butene-, and other alkene-based copolymers. Such copolymers comprise a majority (i.e., greater than 50 weight percent (wt %)) of units derived from the alkene (e.g., propylene) and a minority of units derived from another α-olefin (including ethylene). In an embodiment, the polyolefin elastomer includes a propylene-based copolymer. In further embodiments, the polyolefin elastomer comprises a propylene-ethylene copolymer. Exemplary propylene-based copolymers useful herein include VERSIFY™ polymers available from The Dow Chemical Company, and VISTAMAXX™ polymers available from ExxonMobil Chemical Company. When the component (B) polyolefin elastomer includes a polypropylene, it is different than the component (A) polypropylene.

Polyolefin elastomers can also include ethylene/propylene/diene monomer (EPDM) terpolymer elastomers and chlorinated polyethylenes (CPE). Commercial examples of suitable EPDMs include NORDEL™ EPDMs, available from The Dow Chemical Company. Commercial examples of suitable CPEs include TYRIN™ CPEs, available from The Dow Chemical Company.

In one or more embodiments, the polyolefin elastomer is selected from the group consisting of ethylene-based polyolefin elastomers, propylene-based polyolefin elastomers, and combinations thereof. In such embodiments, the ethylene-based polyolefin elastomer can have an ethylene content of greater than 50 wt %, or greater than 60 wt %, based on the entire weight of the ethylene-based polyolefin elastomer, with the balance consisting of one or more alpha-olefin monomers. Additionally, the ethylene-based polyolefin elastomer can have an ethylene content ranging from greater than 50 wt %, or 60 wt % to 75 wt %, or 90 wt %, based on the entire weight of the ethylene-based polyolefin elastomer, with the balance consisting of one or more alpha-olefin monomers. In various embodiments, the alpha-olefin monomer is octene.

Furthermore, when the polyolefin elastomer is propylene-based, it can have a propylene content of greater than 50 wt %, greater than 70 wt %, or greater than 90 wt %, based on the entire weight of the propylene-based polyolefin elastomer, with the balance consisting of one or more alpha-olefin monomers (including ethylene). Additionally, the propylene-based polyolefin elastomer can have a propylene content ranging from greater than 50 wt %, or 70 wt %, or 90 wt % to 97 wt %, or 98 wt %, or 99 wt %, based on the entire weight of the propylene-based polyolefin elastomer, with the balance consisting of one or more alpha-olefin monomers (including ethylene). In various embodiments, when the polyolefin elastomer is propylene-based, the alpha-olefin comonomer is ethylene. Nonlimiting examples of a suitable propylene-based polyolefin elastomer include propylene copolymer and propylene homopolymer. When the component (B) polyolefin elastomer includes a polypropylene, it is different than the component (A) polypropylene.

In one or more embodiments, the polyolefin elastomer includes an ethylene/octene copolymer.

Polyolefin elastomers suitable for use herein can have a density, in accordance with ASTM D792, from 0.850 g/cm$^3$ to 0.930 g/cm$^3$ (e.g., from 0.850 g/cm$^3$ to 0.920 g/cm$^3$, from 0.850 g/cm³ to 0.910 g/cm³, from 0.850 g/cm³ to 0.900 g/cm³, from 0.850 g/cm³ to 0.890 g/cm³, from 0.860 g/cm³ to 0.880 g/cm³, from 0.865 g/cm³ to 0.875 g/cm³, etc.). Said in another way, in various embodiments, a polyolefin elastomer suitable for use herein has a density from 0.850 g/cm³, or 0.860 g/cm³, or 0.865 g/cm³ to 0.875 g/cm³, or 0.880 g/cm³, or 0.890 g/cm³, or 0.900 g/cm³, or 0.910 g/cm³, or 0.920 g/cm³, or 0.930 g/cm³ in accordance with ASTM D792.

Polyolefin elastomers suitable for use herein can have a melt index from 0.1 g/10 min to 50 g/10 min (e.g., from 0.1 g/10 min to 40 g/10 min, from 0.1 g/10 min to 30 g/10 min, from 0.1 g/10 min to 20 g/10 min, from 0.1 g/10 min to 15 g/10 min, from 0.5 g/10 min to 10 g/10 min, from 0.5 g/10 min to 8 g/10 min, from 1 g/10 min to 8 g/10 min, from 2 g/10 min to 8 g/10 min, from 3 g/10 min to 7 g/10 min, from 4 g/10 min to 6 g/10 min, etc.) in accordance with ASTM D1238 (190° C./2.16 kg). Said in another way, in certain embodiments, polyolefin elastomers suitable for use herein can have a melt index from 0.1 g/10 min, or 0.5 g/10 min, or 1 g/10 min, or 2 g/10 min, or 3 g/10 min, or 4 g/10 min to 5 g/10 min, or 6 g/10 min, or 8 g/10 min, or 10 g/10 min, or 15 g/10 min, or 20 g/10 min, or 30 g/10 min, or 40 g/10 min, or 50 g/10 min in accordance with ASTM D1238 (190° C./2.16 kg).

Polyolefin elastomers suitable for use herein can have one or both of the following properties:

(a) a density from 0.850 g/cm³, or 0.860 g/cm³, or 0.865 g/cm³, or 0.870 g/cm³ to 0.880 g/cm³, or 0.890 g/cm³, or 0.900 g/cm³, or 0.905 g/cm³, or 0.910 g/cm³, or 0.920 g/cm³, or less than 0.930 g/cm³ in accordance with ASTM D792; and/or (b) a melt index from 0.1 g/10 min, or 0.5 g/10 min, or 1 g/10 min, or 2 g/10 min, or 3 g/10 min, or 4 g/10 min to 5 g/10 min, or 6 g/10 min, or 8 g/10 min, or 10 g/10 min, or 15 g/10 min, or 20 g/10 min, or 30 g/10 min, or 40 g/10 min, or 50 g/10 min in accordance with ASTM D1238 (190° C./2.16 kg).

In one or more embodiments, the polyolefin elastomer includes an ethylene/octene copolymer with a density of 0.870 g/cm³ (ASTM D792) and a melt index of 5 g/10 min (ASTM D1238, 190° C./2.16 kg).

The polyolefin elastomer may comprise one or more embodiments disclosed herein.

(C) Polymer Comprising an Acetoacetyl Functional Group

The present composition comprises a polymer comprising an acetoacetyl functional group. In certain embodiments, the present composition comprises from 0.2 wt % to 20 wt % (e.g., from 0.2 wt % to 15 wt %, from 0.2 wt % to 10 wt %, from 0.3 wt % to 5 wt %, from 0.3 wt % to 4 wt %, from 0.4 wt % to 3 wt %, from 0.4 wt % to 2.5 wt %, and/or from 0.4 wt % to 2.1 wt %) of the polymer comprising an acetoacetyl functional group, based on the total weight of the composition. Said in another way, in certain embodiments, the present composition comprises from 0.2 wt %, or 0.3 wt %, or 0.4 wt %, or 0.5 wt %, or 0.8 wt %, or 1.0 wt %, or 1.5 wt %, or 2.0 wt % to 2.1 wt %, or 2.5 wt %, or 3 wt %, or 4 wt %, or 5 wt %, or 10 wt %, or 15 wt %, or 20 wt % of the polymer comprising an acetoacetyl functional group, based on the total weight of the composition.

The "polymer comprising an acetoacetyl functional group" contains a base polymer with at least one acetoacetyl functional group grafted or otherwise bound to the base polymer.

(i) Acetoacetyl Functional Group

An acetoacetyl functional group is a functional group represented by:

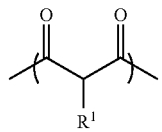

wherein R¹ is hydrogen, an alkyl having 1 to 10 carbon atoms, or phenyl.

Examples of acetoacetyl functional groups include

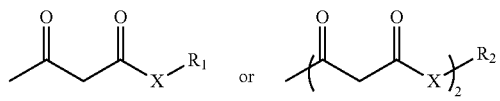

wherein X is O, $R_1$ is a divalent radical, and $R_2$ is a trivalent radical that may attach the acetoacetyl group to the base polymer.

The polymer comprising an acetoacetyl functional group contains at least one or at least two acetoacetyl functional groups per polymer molecule. In various embodiments, the polymer comprising an acetoacetyl functional group contains one or two acetoacetyl functional groups per polymer molecule.

In an embodiment, the polymer comprising an acetoacetyl functional group contains from 0.1 wt %, or 0.5 wt %, or 1 wt %, or 1.5 wt %, or 2.0 wt %, or 2.5 wt %, or 5 wt %, or 10 wt %, or 15 wt %, or 20 wt % to 30 wt %, or 40 wt %, or 50 wt %, or 60 wt % of the acetoacetyl functional group, based on the total weight of the polymer comprising an acetoacetyl functional group.

The acetoacetyl functional group may be incorporated into the base polymer through the use of an acetoacetyl-containing monomer such as acetoacetoxyethyl methacrylate ("AAEM"), acetoacetoxyethyl acrylate, acetoacetoxypropyl methacrylate, allyl acetoacetate, acetoacetoxybutyl methacrylate, 2,3-di(acetoacetoxy)propyl methacrylate, 2-(acetoacetoxy) ethyl methacrylate, t-butyl acetoacetate, diketene, and the like, or combinations thereof. The acetoacetyl-containing monomer may be incorporated into the base polymer through free radical polymerization, such as by emulsion polymerization, dispersion polymerization, solution polymerization, or bulk polymerization.

(ii) Base Polymer

The base polymer of the polymer comprising an acetoacetyl functional group may be polyethylene, polypropylene, an acrylic polymer, a vinyl acetate polymer, polystyrene, a styrenic block copolymer, an ethylene/α-olefin copolymer, and combinations thereof.

In various embodiments, the base polymer of the polymer comprising an acetoacetyl functional group is polyethylene. The polyethylene may be any polyethylene previously disclosed herein. In an embodiment, the polyethylene is an ethylene/α-olefin interpolymer, such as an ethylene/octene copolymer or an ethylene/butene copolymer. When the base polymer of the polymer comprising an acetoacetyl functional group is polyethylene and the polyolefin elastomer is polyethylene, the component (C) polyethylene comprising an acetoacetyl functional group is different than the component (B) polyolefin elastomer polyethylene because the component (B) polyolefin elastomer polyethylene lacks an acetoacetyl functional group.

In various embodiments, the base polymer of the polymer comprising an acetoacetyl functional group is polypropylene. The polypropylene may be any polypropylene previously disclosed herein. When the base polymer of the polymer comprising an acetoacetyl functional group is polypropylene, the component (C) polypropylene comprising an acetoacetyl functional group is different than the component (A) polypropylene because the component (A) polypropylene lacks an acetoacetyl functional group.

In various embodiments, the base polymer of the polymer comprising an acetoacetyl functional group is an acrylic polymer. An "acrylic polymer" is a polyester based on acrylic acid, methacrylic acid, acrylonitrile, acrylamide, cyanoacrylates, and combinations thereof. A nonlimiting example of a suitable acrylic polymer is FORMASHIELD™ 12, available from The Dow Chemical Company.

In various embodiments, the base polymer of the polymer comprising an acetoacetyl functional group is a vinyl acetate polymer. A "vinyl acetate polymer" is a polymer containing polymerized vinyl acetate and, optionally, may contain at least one comonomer. Nonlimiting examples of suitable vinyl acetate polymer include polyvinyl acetate (PVA), poly(ethylene-vinyl acetate) (PEVA), and combinations thereof.

In various embodiments, the base polymer of the polymer comprising an acetoacetyl functional group is polystyrene.

In various embodiments, the base polymer of the polymer comprising an acetoacetyl group is a styrenic block copolymer. The styrenic block polymer contains from greater than 1 wt %, or 10 wt %, or 15 wt %, or 16 wt %, or 18 wt % to 20 wt %, or 25 wt %, or 30 wt %, or 35 wt %, or 40 wt %, or 45 wt %, or less than 50 wt % of polymerized styrene, based on the total weight of the styrenic block copolymer. Nonlimiting examples of suitable styrenic block copolymers include styrene-isoprene-styrene block copolymers (SIS), styrene-butadiene-styrene block copolymers (SBS), styrene-ethylene/butylene-styrene block copolymers (SEBS), styrene-isobutylene-styrene block copolymers (SIBS), styrene-ethylene-propylene-styrene block copolymers (SEPS), and mixtures thereof. Nonlimiting examples of suitable styrenic block polymers include those commercially available under the tradename KRATON, such as KRATON D1161, KRATON D1118, KRATON G1657, and the like, available from Kraton Corp., Houston, Tex.; or those commercially available under the trade name VECTOR, such as 4113A, 4114A, 4213A, and the like, available from Dexco Polymers, Houston, Tex.

In various embodiments, the base polymer of the polymer comprising an acetoacetyl functional group is selected from an acrylic polymer, an ethylene homopolymer, ethylene/octene copolymer, ethylene/butene copolymer, a propylene homopolymer, a vinyl acetate polymer, polystyrene, SEBS, and combinations thereof.

In various embodiments, the polymer comprising an acetoacetyl functional group is a polystyrene polymer comprising an acetoacetoxyethyl methacrylate (AAEM) group.

Polymer comprising an acetoacetyl functional group suitable for use herein have a glass transition temperature (Tg) from 50° C., or 60° C., or 70° C., or 75° C., or 80° C., or 85° C., or 90° C. to 95° C., or 100° C., or 110° C., or 115° C., or 120° C. In various embodiments, the polymer comprising an acetoacetyl functional group has a glass transition temperature (Tg) greater than 50° C., or greater than 60° C., or greater than 70° C.

In one or more embodiments, the polymer comprising an acetoacetyl functional group is a polystyrene polymer comprising an acetoacetoxyethyl methacrylate (AAEM) group having a glass transition temperature (Tg) of 90° C.

The polymer comprising an acetoacetyl functional group may comprise one or more embodiments disclosed herein.

(D) Compatibilizer Component

The present composition comprises a compatibilizer component. In certain embodiments, the present composition comprises from 0.01 wt % to 10 wt % (e.g., 0.05 wt % to 8.0 wt %, from 0.1 wt % to 5.0 wt %, from 0.1 wt % to 4.0 wt %, etc.) of the compatibilizer component, based on the total weight of the composition. In certain embodiments, the present composition comprises from 0.01 wt %, or 0.05 wt %, or 0.1 wt %, or 0.2 wt %, or 0.3 wt %, or 0.4 wt %, or 0.5 wt %, or 0.6 wt % to 0.8 wt %, or 1.0 wt %, or 1.5 wt %, or 2.0 wt %, or 3.0 wt %, or 4.0 wt %, or 5.0 wt %, or 8.0 wt %, or 10 wt % of the compatibilizer component, based on the total weight of the composition.

The compatibilizer component improves the compatibility between the (B) polyolefin elastomer and the (C) polymer comprising an acetoacetyl functional group.

The compatibilizer component may be a styrenic block copolymer, an ethylene acrylic acid (EAA) copolymer, an ethylene ethyl acrylate (EEA) copolymer, a block composite, a specified block composite, a crystalline block composite, and/or combinations thereof.

In various embodiments, the compatibilizer component is a styrenic block copolymer. The styrenic block copolymer may be any styrenic block copolymer disclosed herein. In an embodiment, the styrenic block copolymer is SEBS.

Styrenic block copolymer suitable for use herein can have a density, in accordance with ASTM D792, from 0.850 g/cm$^3$, or 0.860 g/cm$^3$, or 0.870 g/cm$^3$, or 0.880 g/cm$^3$ to 0.885 g/cm$^3$, or 0.890 g/cm$^3$, or 0.900 g/cm$^3$.

Styrenic block copolymer suitable for use herein can have a melt flow rate from 5 g/10 min, or 10 g/10 min, or 15 g/10 min, or 20 g/10 min to 25 g/10 min, or 30 g/10 min, or 40 g/10 min, or 50 g/10 min (ASTM D1238, 230° C./5.00 kg).

Styrenic block copolymer suitable for use herein can have one or both of the following properties:

(a) a density, in accordance with ASTM D792, from 0.850 g/cm$^3$, or 0.860 g/cm$^3$, or 0.870 g/cm$^3$, or 0.880 g/cm$^3$ to 0.885 g/cm$^3$, or 0.890 g/cm$^3$, or 0.900 g/cm$^3$; and/or (b) a melt flow rate from 5 g/10 min, or 10 g/10 min, or 15 g/10 min, or 20 g/10 min to 25 g/10 min, or 30 g/10 min, or 40 g/10 min, or 50 g/10 min (ASTM D1238, 230° C./5.00 kg).

In one or more embodiments, the compatibilizer component is a styrenic block copolymer that is SEBS having a density, in accordance with ASTM D792, of 0.880 g/cm$^3$ and a melt flow rate of 22 g/10 min (ASTM D1238 230° C./5.00 kg).

While the base polymer of the polymer comprising an acetoacetyl functional group and the compatibilizer component may each be a styrenic block copolymer, the component (C) polymer comprising an acetoacetyl functional group and the component (D) compatibilizer are different because the component (D) compatibilizer lacks an acetoacetyl functional group.

In various embodiments, the compatibilizer component is an ethylene acrylic acid (EAA) copolymer. The EAA copolymer may contain from 1 wt %, or 5 wt %, or 10 wt %, or 12 wt %, or 15 wt %, or 18 wt % to 19 wt %, or 20 wt %, or 25 wt %, or 30 wt %, or 40 wt %, or less than 50 wt % polymerized ethyl acrylate, based on the total weight of the EEA copolymer. EEA copolymer suitable for use herein can have a density, in accordance with ASTM D792, from 0.920 g/cm$^3$, or 0.925 g/cm$^3$, or 0.930 g/cm$^3$ to 0.935 g/cm$^3$, or 0.940 g/cm$^3$, or 0.945 g/cm$^3$. EEA copolymer suitable for use herein can have a melt index from 0.5 g/10 min, or 1 g/10 min, or 2 g/10 min, or 5 g/10 min to 6 g/10 min, or 8 g/10 min, or 10 g/10 min, or 15 g/10 min, or 20 g/10 min (ASTM D1238, 190° C./2.16 kg).

In one or more embodiments, the compatibilizer component is an EEA copolymer containing 18.5 wt % polymerized ethyl acrylate, based on the total weight of the EEA copolymer, that has a density, in accordance with ASTM D792, of 0.931 g/cm$^3$ and a melt index of 6.0 g/10 min (ASTM D1238, 190° C./2.16 kg).

In certain embodiments, the compatibilizer component is a block composite. "Block composite" refers to polymers comprising an ethylene based polymer (EP) (soft copolymer) having an ethylene content of from 10 mol % to 90 mol %, an alpha-olefin based polymer (AOP) (hard copolymer) having an alpha-olefin content of greater than 90 mol %, and a block copolymer (diblock) having an ethylene block/segment (EB) (soft block) and an alpha-olefin block/segment (AOB) (hard block), wherein the ethylene block of the block copolymer is the same composition as the ethylene based polymer of the block composite and the alpha-olefin block of the block copolymer is the same composition as the alpha-olefin based polymer of the block composite. The compositional split between the amount of ethylene based polymer and alpha-olefin based polymer will be essentially the same as that between the corresponding blocks in the block copolymer. The block composite of the present disclosure is similar to those disclosed in U.S. Pat. Nos. 8,053,529; 8,686,087; and 8,716,400, which are incorporated herein by reference. Suitable processes useful in producing the block composites may be found in, U.S. Pat. Nos. 8,053,529; 8,686,087; and 8,716,400.

"Hard" blocks/segments refer to highly crystalline blocks of polymerized units in which a monomer (e.g., propylene) is present in an amount greater than 90 mole percent. In other words, the comonomer content (e.g., ethylene content) in the hard blocks/segments is less than 10 mole percent. In some embodiments, the hard segments comprise all or substantially all propylene units (such as an iPP—isotactic polypropylene—copolymer or homopolymer block). "Soft" blocks/segments, on the other hand, refer to amorphous, substantially amorphous, or elastomeric blocks of polymerized units in which a monomer (e.g., ethylene) is present in an amount from 10 mole percent to 90 mole percent.

In exemplary embodiments, the block composite may have a total ethylene content that is from 25 wt % to 70 wt % (e.g., from 25 wt % to 60 wt %, from 25 wt % to 55 wt %, and from 30 wt % to 50 wt %) based on the total weight of the block composite. In other words, in certain embodiments, the block composite may comprise from 20 wt %, or 25 wt %, or 30 wt %, or 35 wt %, or 40 wt % to 45 wt %, to 50 wt %, or 55 wt %, or 60 wt %, or 65 wt %, or 70 wt %, or 75 wt %, or 80 wt % of polymerized ethylene, based on the total weight of the block composite. The remainder of the total weight of the block composite may be accounted for by units derived from at least one C3-10 alpha-olefin. For example, the remainder of the total weight of the block composite may be accounted for by units derived from propylene.

In exemplary embodiments, the block composite refers to polymers comprising a soft copolymer having an ethylene content that is from 10 mol % to 90 mol %, a hard copolymer having a propylene content that is greater than 90 mol %, and a block copolymer (e.g., a diblock) having a soft block (i.e., soft segment) and a hard block (i.e., hard segment), wherein the hard block of the block copolymer is the same composition as the hard copolymer of the block composite and the soft block of the block copolymer is the same composition as the soft copolymer of the block composite. The compositional split between the amount of soft copolymer and hard copolymer will be essentially the same as that between the corresponding blocks in the block copolymer.

In certain embodiments, the block composite refers to polymers comprising a soft copolymer having an ethylene content that is greater than 10 wt % and less than 86 wt %, a hard copolymer having a propylene content that is greater than 80 wt % and up to 100 wt %, and a block copolymer (e.g., a diblock) having a soft block (i.e., soft segment) and a hard block (i.e., hard segment), wherein the hard block of the block copolymer is the same composition as the hard copolymer of the block composite and the soft block of the block copolymer is the same composition as the soft copolymer of the block composite. The compositional split between the amount of soft copolymer and hard copolymer will be essentially the same as that between the corresponding blocks in the block copolymer.

In exemplary embodiments, the hard blocks refer to highly crystalline blocks of polymerized alpha-olefin units (e.g., propylene). In the hard blocks, the monomer (i.e., propylene) may be present in an amount greater than 80 wt % (e.g., greater than 85 wt %, greater than 90 wt %, and/or greater than 95 wt %). The remainder of the hard block may be the comonomer (e.g., ethylene) in an amount of less than 20 wt % (e.g., less than 15 wt % and/or less than 10 wt %). In exemplary embodiments, the hard blocks comprise all or substantially all propylene units, such as an iPP (isotactic) homopolymer block or an iPP copolymer block with less than 10 wt % of ethylene. In exemplary embodiments, the soft blocks refer to amorphous, substantially amorphous, or elastomer blocks of polymerized ethylene units. In the soft blocks, the monomer (i.e., ethylene) may be present in an amount of greater than 20 wt % and equal to or less than 100 wt % (e.g., from 40 wt % to 99 wt %, from 45 wt % to 90 wt %, and/or from 50 wt % to 80 wt %). The remainder of the soft block may be the comonomer (e.g., propylene).

According to an exemplary embodiment, the block composite includes a block copolymer having 30-70 wt % hard block and 30-70 wt % soft block. In other words, the block composite includes a block copolymer having 30-70 wt % hard block and 30-70 wt % soft block based on the weight of the block copolymer.

According to an exemplary embodiment, the block copolymer of the block composite has the formula (EP)-(iPP), in which EP represents the soft block of polymerized ethylene and propylene monomeric units (e.g., 50-80 wt % of ethylene and remainder propylene) and iPP represents a hard block of isotactic propylene homopolymer or isotactic propylene copolymer (e.g., less than 10 wt % of ethylene and remainder propylene).

The block composite may include from 0.5 wt % to 95.0 wt % EP, from 0.5 to 95.0 wt % iPP, and from 5.0 wt % to 99.0 wt % of the block copolymer. Weight percents are based on total weight of block composite. The sum of the weight percents of EP, iPP, and the block copolymer equals 100%. An exemplary measurement of the relative amount of the block copolymer is referred to as the Block Composite Index (BCI), as further discussed below. The BCI for the block composite is greater than 0 and less than 1.0. A block composite suitable for use herein can have a Block Composite Index (BCI) from 0.1, or 0.2, or 0.3, or 0.4 to 0.5, or 0.6, or 0.7, or 0.8, or 0.9, or 1.0. "BCI," as used herein, is the weight percentage of diblock copolymer divided by 100% (i.e., weight fraction). The value of the block composite index can range from 0 to 1, wherein 1 would be equal to 100% diblock and zero (0) would be for a material such as a traditional blend or random copolymer. Methods for determining BCI can be found, for example, in U.S. Published Patent Application No. 2011/0082258 from paragraph [0170] to [0189]; and in U.S. Pat. No. 8,716,400 from column 33 to column 35, each incorporated herein by reference.

In some embodiments, the block composite may have a microstructure index greater than 1 and equal to or less than 20. The microstructure index is an estimation using solvent gradient interaction chromatography (SGIC) separation to differentiate between block copolymers from random copolymers. In particular, microstructure index estimation relies on differentiating between two fractions, i.e., a higher random copolymer content fraction and a higher block copolymer content fraction, of which the random copolymer and the block copolymer have essentially the same chemical composition. The early eluting fraction (i.e., the first fraction) correlates to random copolymers and the late eluting component (i.e., the second fraction) correlates to block copolymers. The calculation of the microstructure index is discussed below.

The block composite may have a weight average molecular weight (Mw) from 10,000 g/mol to 2,500.00 g/mol, from 35,000 g/mol to 1,000,000 g/mol, from 50,000 g/mol to 300,000 g/mol, and/or from 50,000 g/mol to 200,000 g/mol. For example, the Mw may be from 20 kg/mol to 1,000 kg/mol, from 50 kg/mol to 500 kg/mol, and/or from 80 kg/mol to 200 kg/mol. The molecular weight distribution (Mw/Mn) or polydispersity of the block composite may be less than 5, between 1 and 5, and/or between 1.5 and 4. A block composite suitable for use herein can have a Mw/Mn from greater than 1.0, or 1.5, or 2.0, or 3.0 to 3.5, or 4.0, or 5.0. Weight average molecular weight (Mw) and number average molecular weight (Mn) are well known in polymer art and can be determined by methods known to a person of ordinary skill in the art.

The melt flow rate (MFR) of the block composite may be from 0.1 g/10 min to 1,000 g/10 min measured in accordance with ASTM D-1238 or ISO 1133 (230° C.; 2.16 kg). For example, the melt flow rate of the block composite may be from 3 g/10 min to 60 g/10 min (e.g., from 3 g/10 min to 20 g/10 min, from 3 g/10 min to 15 g/10 min, and from 3 g/10 min to 10 g/10 min). A block composite suitable for use herein can have a melt flow rate from 0.5 g/10 min, or 1 g/10 min, or 2 g/10 min, or 5 g/10 min, or 6 g/10 min to 7 g/10 min, or 8 g/10 min, or 10 g/10 min, or 15 g/10 min, or 20 g/10 min (ASTM D1238, 230° C./2.16 kg).

The density of the block composite may be from 0.850 g/cc to 0.920 g/cc in accordance with ASTM D792. In exemplary embodiments, the density of the block composite is from 0.860 to 0.895 g/cc, from 0.865 to 0.895, and/or from 0.865 to 0.890 g/cc. A block composite suitable for use herein can have a density from 0.850 g/cc, or 0.860 g/cc, or 0.870 g/cc, or 0.875 g/cc to 0.880 g/cc, or 0.890 g/cc, or 0.900 g/cc.

The block composite may have a second peak Tm of greater than 90° C. (e.g., greater than 100° C.). According to an exemplary embodiment, the block composites exhibit a second peak Tm in a range from 100° C. to 150° C.).

In certain embodiments, the block composite comprises an "EP/iPP diblock" that is a block copolymer having from 1 wt %, or 10 wt %, or 20 wt %, or 30 wt % to 50 wt %, or 55 wt %, or 70 wt %, or 80 wt %, or 99 wt % of ethylene/propylene (EP) soft blocks (with 65 wt % of ethylene, based on the total weight of the EP block) and from 1 wt %, or 10 wt %, or 20 wt %, or 30 wt % to 50 wt %, or 55 wt %, or 70 wt %, or 80 wt %, or 99 wt % of isotactic polypropylene (iPP) hard blocks.

A block composite suitable for use herein can have a crystallization temperature (Tc) from 70° C., or 75° C., or 80° C., or 90° C., or 95° C. to 97° C., or 100° C., or 110° C., or 120° C.

A block composite suitable for use herein can have a heat of fusion ($H_f$) from 40 J/g, or 45 J/g, or 50 J/g to 55 J/g, or 60 J/g, or 65 J/g, or 70 J/g.

A block composite suitable for use herein can have one, some, or all of the following properties:

(a) from 1 wt %, or 10 wt %, or 20 wt %, or 30 wt % to 50 wt %, or 55 wt %, or 70 wt %, or 80 wt %, or 99 wt % of EP soft blocks, based on the total weight of the EP/iPP diblock;

(b) from 1 wt %, or 10 wt %, or 20 wt %, or 30 wt % to 50 wt %, or 55 wt %, or 70 wt %, or 80 wt %, or 99 wt % of iPP hard blocks, based on the total weight of the EP/iPP diblock;

(c) a melt flow rate from 0.5 g/10 min, or 1 g/10 min, or 2 g/10 min, or 5 g/10 min, or 6 g/10 min to 7 g/10 min, or 8 g/10 min, or 10 g/10 min, or 15 g/10 min, or 20 g/10 min (230° C./2.16 kg);

(d) a crystallization temperature (Tc) from 70° C., or 75° C., or 80° C., or 90° C., or 95° C. to 97° C., or 100° C., or 110° C., or 120° C.;

(e) a heat of fusion ($H_f$) from 40 J/g, or 45 J/g, or 50 J/g to 55 J/g, or 60 J/g, or 65 J/g, or 70 J/g;

(f) a Mw/Mn from greater than 1.0, or 1.5, or 2.0, or 3.0 to 3.5, or 4.0, or 5.0;

(g) a density from 0.850 g/cc, or 0.860 g/cc, or 0.870 g/cc, or 0.875 g/cc to 0.880 g/cc, or 0.890 g/cc, or 0.900 g/cc; and/or (h) a BCI from 0.1, or 0.2, or 0.3, or 0.4 to 0.5, or 0.6, or 0.7, or 0.8, or 0.9, or 1.0.

In various embodiments, the block composite has at least two, or at least three, or at least four, or at least five, or at least six, or at least seven, or all of properties (a)-(h).

In one or more embodiments, the compatibilizer is a block composite with 54.3 wt % EP blocks, 45.7 wt % iPP blocks, 65 wt % ethylene based on the total weight of the EP blocks, 35.5 wt % ethylene based on the total weight of the block composite, a melt flow rate of 6.5 g/10 min (230° C./2.16 kg), a crystallization temperature (Tc) of 96° C., a heat of fusion ($H_f$) of 52 J/g, a Mw/Mn of 2.98, a density of 0.879 g/cc, and a BCI of 0.482.

In an embodiment, the compatibilizer is a specified block composite. "Specified block composite" refers to polymers comprising an ethylene based polymer (EP) (soft copolymer) having an ethylene content of from 78 mol % to 90 mol %, an alpha-olefin based polymer (AOP) (hard copolymer) having an alpha-olefin content of from 61 mol % to 90 mol %, and a block copolymer (diblock) having an ethylene block/segment (EB) and an alpha-olefin block/segment (AOB), wherein the ethylene block of the block copolymer is the same composition as the ethylene based polymer of the specified block composite and the alpha-olefin block of the block copolymer is the same composition as the alpha-olefin based polymer of the specified block composite. The compositional split between the amount of ethylene based polymer and alpha-olefin based polymer will be essentially the same as that between the corresponding blocks in the block copolymer. The specified block composite of the present disclosure is similar to those disclosed in WO 2017/044547, which is incorporated herein by reference.

In an embodiment, the compatibilizer is a crystalline block composite. "Crystalline block composite" refers to polymers comprising a crystalline ethylene based polymer (CEP) having an ethylene content of greater than 90 mol %, a crystalline alpha-olefin based polymer (CAOP) having an alpha-olefin content of greater than 90 mol %, and a block copolymer (diblock) having a crystalline ethylene block (CEB) and a crystalline alpha-olefin block (CAOB), wherein the CEB of the block copolymer is the same composition as the CEP of the crystalline block composite and the CAOB of the block copolymer is the same composition as the CAOP of the crystalline block composite. The compositional split between the amount of CEP and CAOP will be essentially the same as that between the corresponding blocks in the block copolymer. The crystalline block composite of the present disclosure is similar to those disclosed in WO 2016/0028961 A1, which is incorporated herein by reference.

The compatibilizer may comprise one or more embodiments disclosed herein.

(E) Additive Component

In certain embodiments, the present composition may comprise an additive component, which includes one or more optional additives. In certain embodiments, the present composition comprises from 0 wt % to 30 wt % (e.g., from 5 wt % to 25 wt %, from 10 wt % to 20 wt %, from 12 wt % to 18 wt %, from 15 wt % to 18 wt %, and/or from 16 wt % to 17 wt %) of an additive component, based on the total weight of the composition. Said in another way, in certain embodiments, the present composition comprises from 0 wt %, or 5 wt %, or 10 wt %, or 12 wt %, or 15 wt %, or 16 wt % to 17 wt %, or 18 wt %, or 20 wt %, or 25 wt %, or 30 wt % of an additive component, based on the total weight of the composition.

Conventional additives, which can be introduced into the composition, are exemplified by talc, antioxidants, mineral oil, pigments, processing aids, flame retardants, ultraviolet (UV) stabilizers, reinforcing filler, calcium carbonate, mica, glass fibers, whisker, anti-scratch additives, and combinations thereof.

In an embodiment, the composition includes talc, such as JetFil™ 700, available from IMERYS. Talc is typically used in amounts of from 0 wt %, or 1 wt %, or 5 wt %, or 10 wt %, or 15 wt %, or 16 wt % to 17 wt %, 18 wt %, or 20 wt %, or 25 wt %, or 30 wt %, based on the total weight of the composition.

Nonlimiting examples of suitable antioxidant includes tris(2,4-ditert-butylphenyl)phosphite, pentaerythritol tetrakis[3-[3,5-di-tert-butyl-4-hydroxyphenyl]propionate], and combinations thereof. In an embodiment, the composition contains an antioxidant such as IRGANOX™ B 225, which contains a blend of 50 wt % tris(2,4-ditert-butylphenyl) phosphite and 50 wt % pentaerythritol tetrakis[3-[3,5-di-tert-butyl-4-hydroxyphenyl]propionate]. Antioxidant is typically used in amounts of from 0 wt %, or 0.05 wt %, or 0.1 wt %, or 0.2 wt % to 0.3 wt %, or 0.5 wt %, or 1 wt %, or 2 wt %, based on the total weight of the composition.

In an embodiment, the composition includes a processing aid. Nonlimiting examples of suitable processing aids include calcium stearate. Processing aids are typically used in amounts of from 0 wt %, or 0.05 wt %, or 0.1 wt % to 0.5 wt %, or 1 wt %, or 2 wt %, based on the total weight of the composition.

In an embodiment, the composition includes an ultraviolet (UV) stabilizer. Nonlimiting examples of suitable ultraviolet (UV) stabilizer include hindered amine light stabilizer (HALS) such as bis(2,2,6,6,-tetramethyl-4-piperidyl)sebaceate (commercially available as Tinuvin™ 770 from BASF) and poly[[6-[(1,1,3,3-tetramethylbutyl)amino]-1,3,5-triazine-2,4-diyl][(2,2,6,6-tetramethyl-4-piperidinyl) imino]-1,6-hexanediyl[(2,2,6,6-tetramethyl-4-piperidinyl) imino]] (commercially available as Chimassorb™ 944 from BASF). UV stabilizers are typically used in amounts of from 0.05 wt %, or 0.1 wt %, or 0.5 wt % to 1 wt %, or 2 wt %, based on the total weight of the composition.

In an embodiment, the composition includes a reinforcing filler. Nonlimiting examples of reinforcing filler include glass fiber, mica, whisker, calcium carbonate ($CaCO_3$), and combinations thereof. Reinforcing filler is typically used in amounts of from 2 wt %, or 5 wt % to 10 wt %, or 15 wt %, or 20 wt %, based on the total weight of the composition.

In an embodiment, the composition includes talc and an antioxidant.

In an embodiment, the composition includes from 0 wt %, or greater than 0 wt %, or 1 wt %, or 5 wt %, or 10 wt %, or 15 wt %, or 16 wt % to 17 wt %, or 20 wt %, or 25 wt %, or 30 wt % total additives, based on the total weight of the composition.

The additive may comprise one or more embodiments disclosed herein.

Composition

The present disclosure provides a composition, and further a thermoplastic polyolefin (POE) composition comprising:

(A) a polypropylene polymer;
(B) a polyolefin elastomer;
(C) a polymer comprising an acetoacetyl functional group;
(D) a compatibilizer component; and
(E) an optional additive component.

In various embodiments, the composition includes:

(A) from 50 wt % to 85 wt % of a polypropylene polymer;
(B) from 5 wt % to 35 wt % of a polyolefin elastomer;
(C) from 0.2 wt % to 20 wt % of a polymer comprising an acetoacetyl functional group;
(D) from 0.01 wt % to 10 wt % of a compatibilizer component; and
(E) from 0 wt % to 30 wt % of an additive component.

In various embodiments, the composition includes:

(A) from 50 wt %, or 55 wt %, or 59 wt % to 63 wt %, or 65 wt %, or 70 wt %, or 75 wt %, or 80 wt %, or 85 wt % of a polypropylene impact copolymer;
(B) from 5 wt %, or 10 wt %, or 15 wt %, or 19 wt % to 21 wt %, or 25 wt %, or 30 wt %, or 35 wt % of an ethylene/octene copolymer;
(C) from 0.2 wt %, or 0.4 wt %, or 0.5 wt % to 1 wt %, or 1.5 wt %, or 2 wt %, or 2.5 wt %, or 5 wt %, or 10 wt %, or 15 wt %, or 20 wt % of a polystyrene polymer comprising an acetoacetoxyethyl methacrylate (AAEM) group;
(D) from 0.01 wt %, or 0.05 wt %, or 0.1 wt % to 0.6 wt %, or 1.0 wt %, or 1.5 wt %, or 2.0 wt %, or 2.5 wt %, or 3.0 wt %, or 3.5 wt %, or 4.0 wt %, or 5.0 wt %, or 10 wt % of a compatibilizer component selected from SEBS, EEA copolymer, a block composite, and combinations thereof; and
(E) from 5 wt %, or 10 wt %, or 15 wt % to 16 wt %, or 18 wt %, or 20 wt %, or 25 wt %, or 30 wt % of an additive component selected from talc, antioxidant, processing aid, reinforcing filler, and combinations thereof.

It is understood that the sum of the components in each of the foregoing compositions yields 100 weight percent.

The present composition includes at least four different components: (A) polypropylene, (B) polyolefin elastomer, (C) a polymer comprising an acetoacetyl functional; group, and (D) a compatibilizer component. Thus, one component cannot serve as two components. For example, while the base polymer of the (C) polymer comprising an acetoacetyl functional group, and each of the (A) polypropylene and (B) polyolefin elastomer may be a polypropylene, the (C) polypropylene comprising an acetoacetyl functional group is different than the (A) polypropylene and (B) polyolefin elastomer polypropylene because the (A) polypropylene and (B) polyolefin elastomer polypropylene lack an acetoacetyl functional group. Further, when each of the (A) polypropylene and (B) polyolefin elastomer are polypropylene, they are different polypropylenes (e.g., a propylene impact copolymer and a propylene homopolymer).

The present composition advantageously causes aldehyde abatement (i.e., reduction). Aldehydes can be dangerous to the health of humans and/or animals. Aldehydes can also be harmful to the environment. Nonlimiting examples of aldehydes include formaldehyde, acetaldehyde, acrolein, propionaldehyde, and crotonaldehyde.

In various embodiments, the present composition contains equal to or less than 0.02 mg/m$^3$ formaldehyde, as measured in accordance with the VOC Test Method described below in the Test Methods section. In certain embodiments, the present composition comprises from 0 mg/m$^3$ to equal to or less than 0.01 mg/m$^3$, or equal to or less than 0.02 mg/m$^3$, or less than 0.03 mg/m$^3$, or less than 0.05 mg/m$^3$, or less than 0.10 mg/m$^3$, or less than 0.20 mg/m$^3$, or less than 0.25 mg/m$^3$ formaldehyde, as measured in accordance with the VOC Test Method.

In various embodiments, the present composition contains less than 4.00 mg/m$^3$ acetaldehyde, as measured in accordance with the VOC Test Method. In certain embodiments, the present composition comprises from 0 mg/m$^3$ to 1.70 mg/m$^3$, or 2.00 mg/m$^3$, or 2.30 mg/m$^3$, or 2.50 mg/m$^3$, or 2.60 mg/m$^3$, or 2.80 mg/m$^3$, or 2.90 mg/m$^3$, or 3.00 mg/m$^3$, or 3.30 mg/m$^3$, 3.50 mg/m$^3$, or 3.90 mg/m$^3$, 3.93 mg/m$^3$, or 3.95 mg/m$^3$, or less than 4.00 mg/m$^3$ acetaldehyde, as measured in accordance with the VOC Test Method.

In various embodiments, the present composition contains less than 0.01 mg/m$^3$ acrolein, as measured in accordance with the VOC Test Method. In certain embodiments, the present composition comprises from 0 mg/m$^3$ to less than 0.01 mg/m$^3$, or less than 0.02 mg/m$^3$, or less than 0.03 mg/m$^3$, or less than 0.05 mg/m$^3$ acrolein, as measured in accordance with the VOC Test Method.

In various embodiments, the present composition contains less than 1.00 mg/m$^3$ propionaldehyde, as measured in accordance with the VOC Test Method. In certain embodiments, the present composition comprises from 0 mg/m$^3$ to less than 0.01 mg/m$^3$, or less than 0.05 mg/m$^3$, or less than 0.10 mg/m$^3$, or less than 0.20 mg/m$^3$, or less than 0.25 mg/m$^3$, or less than 0.30 mg/m$^3$, or less than 0.35 mg/m$^3$, or less than 0.40 mg/m$^3$, or less than 0.45 mg/m$^3$, or less than 0.50 mg/m$^3$, or less than 0.60 mg/m$^3$, or less than 0.70 mg/m$^3$, or less than 0.80 mg/m$^3$, or less than 0.90 mg/m$^3$, or less than 1.00 mg/m$^3$ propionaldehyde, as measured in accordance with the VOC Test Method.

In various embodiments, the present composition contains equal to or less than 0.03 mg/m$^3$ crotonaldehyde, as measured in accordance with the VOC Test Method. In certain embodiments, the present composition comprises from 0 mg/m$^3$ to less than 0.01 mg/m$^3$, or less than 0.02 mg/m$^3$, or equal to or less than 0.03 mg/m$^3$, or less than 0.05 mg/m$^3$, or less than 0.06 mg/m$^3$ crotonaldehyde, as measured in accordance with the VOC Test Method.

In various embodiments, the present composition has a flexural modulus (Young's modulus) from 1200 MPa, or 1400 MPa to 1775 MPa, or 1800 MPa, or 2000 MPa, as measured in accordance with ISO 178. In certain embodiments, the present composition has a flexural modulus (Young's modulus) of greater than 1450 MPa, as measured in accordance with ISO 178.

In various embodiments, the present composition has a flexural yield strength from 20 MPa, or 25 MPa to 35 MPa, or 40 MPa, as measured in accordance with ISO 178. In certain embodiments, the present composition has a flexural yield strength of greater than 25 MPa, as measured in accordance with ISO 178.

In various embodiments, the present composition has a tensile modulus from 1000 MPa, or 1250 MPa to 1650 MPa, or 2000 MPa, as measured in accordance with ISO 527. In certain embodiments, the present composition has a tensile modulus of greater than 1250 MPa, as measured in accordance with ISO 527.

In various embodiments, the present composition has a tensile yield strength from 18 MPa, or 20 MPa to 21.4 MPa, or 25 MPa, or 30 MPa, as measured in accordance with ISO 527. In certain embodiments, the present composition has a tensile yield strength of greater than 20 MPa, as measured in accordance with ISO 527.

In various embodiments, the present composition has an impact strength (Notched IZOD) at 23° C. from 15 kJ/m$^2$, or 20 kJ/m$^2$ to 40 kJ/m$^2$, or 50 kJ/m$^2$, as measured in accordance with ISO 180. In certain embodiments, the present composition has an impact strength (Notched IZOD) at 23° C. of greater than 24 kJ/m$^2$, as measured in accordance with ISO 180.

In various embodiments, the present composition has an impact strength (Notched IZOD) at −30° C. from 2 kJ/m$^2$, or 3.5 kJ/m$^2$ to 6.0 kJ/m$^2$, or 8 kJ/m$^2$, as measured in accordance with ISO 180. In certain embodiments, the present composition has an impact strength (Notched IZOD) at −30° C. of greater than 4 kJ/m$^2$, as measured in accordance with ISO 180.

In various embodiments, the composition contains less than 0.10 mg/m$^3$ formaldehyde, less than 4.00 mg/m$^3$ acetaldehyde, less than 0.05 mg/m$^3$ acrolein, less than 1.00 mg/m$^3$ propionaldehyde, and/or less than 0.10 mg/m$^3$ crotonaldehyde, as measured in accordance with the VOC Test Method. In one or more embodiments, the present composition can have one, some, or all of the following properties:

(i) a flexural modulus from 1200 MPa, or 1400 MPa to 1775 MPa, or 1800 MPa, or 2000 MPa;

(ii) a flexural yield strength from 20 MPa, or 25 MPa to 35 MPa, or 40 MPa;

(iii) a tensile modulus from 1000 MPa, or 1250 MPa to 1650 MPa, or 2000 MPa;

(iv) a tensile yield strength from 18 MPa, or 20 MPa to 21.4 MPa, or 25 MPa, or 30 MPa;

(v) an impact strength (Notched IZOD) at 23° C. from 15 kJ/m$^2$, or 20 kJ/m$^2$ to 40 kJ/m$^2$, or 50 kJ/m$^2$; and/or (vi) an impact strength (Notched IZOD) at −30° C. from 2 kJ/m$^2$, or 3.5 kJ/m$^2$ to 6.0 kJ/m$^2$, or 8 kJ/m$^2$.

In various embodiments, the composition has at least two, or at least three, or at least four, or at least five, or all of properties (i)-(vi).

In various embodiments, the composition includes:

(A) from 50 wt %, or 55 wt %, or 59 wt % to 63 wt %, or 65 wt %, or 70 wt %, or 75 wt %, or 80 wt %, or 85 wt % of a polypropylene impact copolymer;

(B) from 5 wt %, or 10 wt %, or 15 wt %, or 19 wt % to 21 wt %, or 25 wt %, or 30 wt %, or 35 wt % of an ethylene/octene copolymer;

(C) from 0.2 wt %, or 0.4 wt %, or 0.5 wt % to 1 wt %, or 1.5 wt %, or 2 wt %, or 2.5 wt %, or 5 wt %, or 10 wt %, or 15 wt %, or 20 wt % of a polystyrene polymer comprising an acetoacetoxyethyl methacrylate (AAEM) group;

(D) from 0.01 wt %, or 0.05 wt %, or 0.1 wt % to 0.6 wt %, or 1.0 wt %, or 1.5 wt %, or 2.0 wt %, or 2.5 wt %, or 3.0 wt %, or 3.5 wt %, or 4.0 wt %, or 5.0 wt %, or 10 wt % of a compatibilizer component selected from SEBS, EEA copolymer, a block composite, and combinations thereof; and (E) from 5 wt %, or 10 wt %, or 15 wt % to 16 wt %, or 18 wt %, or 20 wt %, or 25 wt %, or 30 wt % of an additive component selected from talc, antioxidant, processing aid, reinforcing filler, and combinations thereof; and in one or more embodiments, the composition contains less than 0.10 mg/m$^3$ formaldehyde, less than 4.00 mg/m$^3$ acetaldehyde, less than 0.05 mg/m$^3$ acrolein, less than 1.00 mg/m$^3$ propionaldehyde, and/or less than 0.10 mg/m$^3$ crotonaldehyde, as measured in accordance with the VOC Test Method; and in one or more embodiments, the present composition can have one, some, or all of the following properties:

(i) a flexural modulus from 1200 MPa, or 1400 MPa to 1775 MPa, or 1800 MPa, or 2000 MPa;

(ii) a flexural yield strength from 20 MPa, or 25 MPa to 35 MPa, or 40 MPa;

(iii) a tensile modulus from 1000 MPa, or 1250 MPa to 1650 MPa, or 2000 MPa;

(iv) a tensile yield strength from 18 MPa, or 20 MPa to 21.4 MPa, or 25 MPa, or 30 MPa;

(v) an impact strength (Notched IZOD) at 23° C. from 15 kJ/m$^2$, or 20 kJ/m$^2$ to 40 kJ/m$^2$, or 50 kJ/m$^2$; and/or (vi) an impact strength (Notched IZOD) at −30° C. from 2 kJ/m$^2$, or 3.5 kJ/m$^2$ to 6.0 kJ/m$^2$, or 8 kJ/m$^2$.

In various embodiments, the composition has at least two, or at least three, or at least four, or at least five, or all of properties (i)-(vi).

In an embodiment, the composition is non-aqueous. A "non-aqueous" composition excludes a solvent, such as water.

In an embodiment, the composition excludes divalent metal ions such as zinc, calcium, magnesium, and zirconium.

In various embodiments, the composition is in the form of a pellet. The pellet may have a diameter from 2.0 mm, or 2.3 mm to 3.0 mm, or 3.5 mm and a length from 2.0 mm, or 2.3 mm to 3.0 mm, or 3.5 mm. In an embodiment, the composition is in the form of a pellet with a diameter from 2.3 mm to 3.0 mm and a length from 2.3 mm to 3.0 mm.

The present composition may comprise one or more embodiments disclosed herein.

Article

The present disclosure provides an article made from a composition comprising:

(A) a polypropylene polymer;

(B) a polyolefin elastomer;

(C) a polymer comprising an acetoacetyl functional group;

(D) a compatibilizer component; and (E) an optional additive component.

The composition may be any composition previously disclosed herein.

In various embodiments, the article is a molded article. The article may be formed by injection molding or compression molding.

The article may be in the form of an automobile interior part, such as an instrument panel, a door panel, or a seat.

In various embodiments, the article is made from a composition that contains equal to or less than 0.02 mg/m$^3$ formaldehyde, as measured in accordance with the VOC Test Method. In certain embodiments, the article is made from a composition that comprises from 0 mg/m$^3$ to equal to or less than 0.01 mg/m$^3$, or equal to or less than 0.02 mg/m$^3$, or less than 0.03 mg/m$^3$, or less than 0.05 mg/m$^3$, or less than 0.10 mg/m$^3$, or less than 0.20 mg/m$^3$, or less than 0.25 mg/m$^3$ formaldehyde, as measured in accordance with the VOC Test Method.

In various embodiments, the article is made from a composition that contains less than 4.00 mg/m$^3$ acetaldehyde, as measured in accordance with the VOC Test Method. In certain embodiments, the article is made from a composition that comprises from 0 mg/m$^3$ to 1.70 mg/m$^3$, or 2.00 mg/m$^3$, or 2.30 mg/m$^3$, or 2.50 mg/m$^3$, or 2.60 mg/m$^3$, or 2.80 mg/m$^3$, or 2.90 mg/m$^3$, or 3.00 mg/m$^3$, or 3.30 mg/m$^3$, 3.50 mg/m$^3$, or 3.90 mg/m$^3$, 3.93 mg/m$^3$, or 3.95 mg/m$^3$, or less than 4.00 mg/m$^3$ acetaldehyde, as measured in accordance with the VOC Test Method.

In various embodiments, the article is made from a composition that contains less than 0.01 mg/m$^3$ acrolein, as measured in accordance with the VOC Test Method. In certain embodiments, the article is made from a composition comprising from 0 mg/m$^3$ to less than 0.01 mg/m$^3$, or less than 0.02 mg/m$^3$, or less than 0.03 mg/m$^3$, or less than 0.05 mg/m$^3$ acrolein, as measured in accordance with the VOC Test Method.

In various embodiments, the article is made from a composition that contains less than 1.00 mg/m$^3$ propionaldehyde, as measured in accordance with the VOC Test Method. In certain embodiments, the article is made from a composition comprising from 0 mg/m$^3$ to less than 0.01 mg/m$^3$, or less than 0.05 mg/m$^3$, or less than 0.10 mg/m$^3$, or less than 0.20 mg/m$^3$, or less than 0.25 mg/m$^3$, or less than 0.30 mg/m$^3$, or less than 0.35 mg/m$^3$, or less than 0.40 mg/m$^3$, or less than 0.45 mg/m$^3$, or less than 0.50 mg/m$^3$, or less than 0.60 mg/m$^3$, or less than 0.70 mg/m$^3$, or less than 0.80 mg/m$^3$, or less than 0.90 mg/m$^3$, or less than 1.00 mg/m$^3$ propionaldehyde, as measured in accordance with the VOC Test Method.

In various embodiments, the article is made from a composition that contains equal to or less than 0.03 mg/m$^3$ crotonaldehyde, as measured in accordance with the VOC Test Method. In certain embodiments, the article is made from a composition comprising from 0 mg/m$^3$ to less than 0.01 mg/m$^3$, or less than 0.02 mg/m$^3$, or equal to or less than 0.03 mg/m$^3$, or less than 0.05 mg/m$^3$, or less than 0.06 mg/m$^3$ crotonaldehyde, as measured in accordance with the VOC Test Method.

In various embodiments, the article is made from a composition that contains less than 0.10 mg/m$^3$ formaldehyde, less than 4.00 mg/m$^3$ acetaldehyde, less than 0.05 mg/m$^3$ acrolein, less than 1.00 mg/m$^3$ propionaldehyde, and/or less than 0.10 mg/m$^3$ crotonaldehyde, as measured in accordance with the VOC Test Method. In one or more embodiments, the article is made from a composition that can have one, some, or all of the following properties:

(i) a flexural modulus from 1200 MPa, or 1400 MPa to 1775 MPa, or 1800 MPa, or 2000 MPa;

(ii) a flexural yield strength from 20 MPa, or 25 MPa to 35 MPa, or 40 MPa;

(iii) a tensile modulus from 1000 MPa, or 1250 MPa to 1650 MPa, or 2000 MPa;

(iv) a tensile yield strength from 18 MPa, or 20 MPa to 21.4 MPa, or 25 MPa, or 30 MPa;

(v) an impact strength (Notched IZOD) at 23° C. from 15 kJ/m², or 20 kJ/m² to 40 kJ/m², or 50 kJ/m²; and/or (vi) an impact strength (Notched IZOD) at −30° C. from 2 kJ/m², or 3.5 kJ/m² to 6.0 kJ/m², or 8 kJ/m².

In various embodiments, the article is made from a composition that has one, at least two, or at least three, or at least four, or at least five, or all of properties (i)-(vi).

The present article may comprise one or more embodiments disclosed herein.

The present compositions and articles advantageously contain a low concentration of aldehydes such as formaldehyde, acetaldehyde, acrolein, propionaldehyde, and crotonaldehyde; while maintaining or improving upon the mechanical properties necessary for automobile interior parts. Not wishing to be bound by any particular theory, Applicants believe the methylene group(s) within the acetoacetyl functional group(s) present in the (C) polymer comprising an acetoacetyl functional group reacts with aldehydes present in the composition, such as by a nucleophilic addition reaction, which reduces the aldehyde concentration. An example of the nucleophilic addition reaction is depicted in Equation (1) below, which depicts the abatement of formaldehyde by a polymer comprising two acetoacetyl groups. Such a reaction (i.e., abatement) is not limited to use of two acetoacetyl groups and can also occur with a single acetoacetyl group.

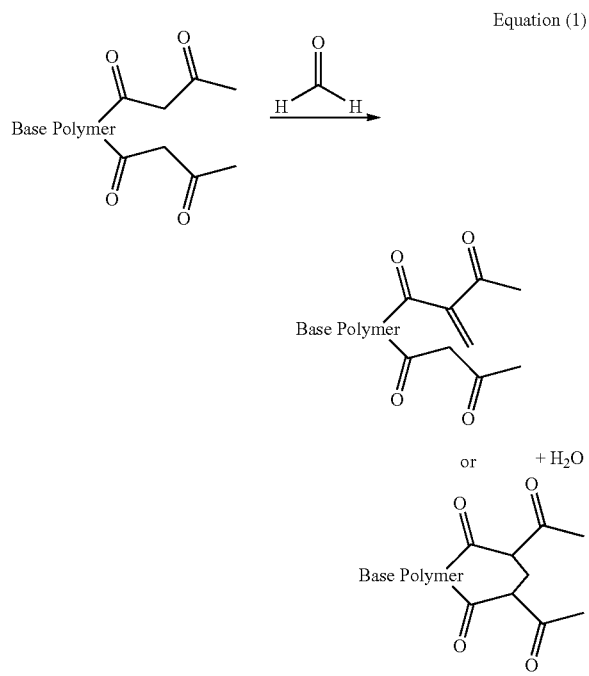

Equation (1)

The (C) polymer comprising an acetoacetyl functional group reduces the aldehyde concentration of the composition, the article, and may reduce the aldehyde concentration of other automobile interior parts (such as when the acetoacetyl functional group(s) reacts with aldehydes present in the interior air of an automobile). Further, the present compositions and articles exhibit a balance between toughness (demonstrated by the tensile impact properties such as IZOD testing) and stiffness (demonstrated by the tensile and flexural properties) that is advantageous for automobile interior parts.

By way of example, and not limitation, examples of the present disclosure are provided.

EXAMPLES

1. Test Methods

Density is measured in accordance with ASTM D792, Method B. The result is recorded in grams (g) per cubic centimeter (g/cc or g/cm³).

Melt flow rate (MFR) for polypropylene and the block composite is measured in accordance with ASTM D1238, Condition 230° C./2.16 kilogram (kg) weight. The result is recorded in grams (g) eluted per 10 minutes (g/10 min).

Melt flow rate (MFR) for styrenic polymer, including polystyrene and styrenic block copolymer, is measured in accordance with ASTM D1238, Condition 230° C./5.00 kilogram (kg) weight. The result is recorded in g/10 min.

Melt index (MI) is measured in accordance with ASTM D1238, Condition 190° C./2.16 kilogram (kg) weight, also known as $I_2$. The result is reported g/10 min.

Notched IZOD Impact Strength is measured in accordance with ISO 180 at room temperature (23° C.) and at −30° C. The result is recorded in kilojoules (kJ) per square meter (kJ/m²).

Flexural modulus (Young's modulus) is measured in accordance with ISO 178. The result is recorded in megaPascal, or MPa.

Flexural yield strength is measured in accordance with ISO 178. The result is recorded in megaPascal, or MPa.

Tensile modulus is measured in accordance with ISO 527. The result is recorded in megaPascal, or MPa.

Tensile yield strength is measured in accordance with ISO 527. The result is recorded in megaPascal, or MPa.

VOC Test Method: Volatile Organic Chemical (VOC) testing is performed in accordance with the "VOC Test Method" described below, which is revised from the Toyota™ gas bag method TSM 0508G. The VOC Test Method described below is supported by priority application no. PCT/CN2017/086487; any changes from PCT/CN2017/086487 would be apparent to one of ordinary skill in the art as typographical or clerical changes without addition of new matter. In the following working examples, samples are prepared by weighing each component and extruding using a Coperon 18 mm extruder. The compounds are granulated into small pellets by a side cutter granulator. The granulated compounds are used for Total Volatile Organic Chemical (TVOC) testing using the VOC Test Method described below.

The VOC Test Method is performed by weighing 200 g of a sample into a 10 liter (L) gas volume Tedlar™ PVF (polyvinyl fluoride) bag (from Delin Co. ltd, China), and then feeding 5 L of nitrogen into the bag. The bag is then stored at 65° C. for two hours before analysis. Further details of the VOC Test Method are discussed below.

Carbonyl analysis is performed with a 4 liter sample from the bag. The sample is derivatized with dinitrophenylhydrazine (DNPH). Then, the carbonyl compounds are extracted and injected into a high-performance liquid chromatography (HPLC) column and separated using gradient elution. The separated compounds are then quantified by UV detection at 360 nm, with a detection limit of 0.01 mg/m³. Carbonyl analysis provides the concentration of aldehydes, such as formaldehyde, acetaldehyde, acrolein, propionaldehyde, and crotonaldehyde present in the sample. Further details of the carbonyl analysis is provided in the paragraph below, as well as the HPLC conditions of Table 1.

DNPH cartridges (CNWBOND DNPH-Silica cartridge, 350 mg, Cat. No. SEEQ-144102, Anple Co. Ltd.) are employed to absorb the carbonyls emitted from the gas bag. The sampling speed is 330 mL/min and the sampling time is 13 min. After absorption, the DNPH cartridges are eluted with 1 gram (precisely weighed) of ACN, and the ACN solution is analyzed by HPLC to quantify the carbonyls in the sample. The standard solution with six DNPH derivatives (TO11A carbonyl-DNPH mix, Cat. No. 48149-U, 15 ppm for each individual compound, Supelco Co. Ltd.) is diluted by acetonitrile, and the final solution (0.794 ppm wt/wt) is restored in a 2 mL vial for instrument calibration at −4° C. (refrigerator). The 0.794 ppm (wt/wt) standard solution is injected into the HPLC system as a one point external standard for quantification of carbonyls in the sample. The first two peaks are identified as formaldehyde and acetaldehyde according to the standard specification. The response factor is calculated for each derivative according to the formula below:

$$\text{Response factor } i = \frac{\text{Peak Area } i}{0.794}$$

Where:
Response factor i=Response factor of derivative i
Peak Area i=Peak Area of derivative i in standard solution
0.794=standard concentration of 0.794 ppm
The concentration of the aldehyde-DNPH derivative in the sample solution is calculated based on the formula below:

$$\text{Concentration of } i = \frac{\text{Peak Area } i}{\text{Response factor } i}$$

Where:
Concentration of i=Conc. of aldehyde-DNPH derivative in sample solution
Peak Area i=Peak Area of Derivative i in sample solution
Response factor i=Response factor of derivative i
The HPLC conditions are shown below in Table 1.

TABLE 1

| Instrument: | Agilent 1200 HPLC | | | |
|---|---|---|---|---|
| Column: | Supelco Ascentis Express C18, 15 cm*4.6 mm, 2.7 um | | | |
| Mobile Phase: | Solvent A: 0.1% $H_3PO_4$ in Acetonitrile (ACN) Solvent B: 0.1% $H_3PO_4$ in DI water | | | |
| Column Oven: | 15° C. | | | |
| Detection: | DAD detector at 360 nm | | | |
| Gradient: | Time (min) | % A | % B | Flow(ml/min) |
| | 0 | 45 | 55 | 1 |
| | 7 | 45 | 55 | 1 |
| | 14 | 50 | 50 | 1 |
| | 20 | 85 | 15 | 1 |
| | 25 | 100 | 0 | 1 |
| Equilibration Time: | 5 min | | | |
| Injection: | 10 uL | | | |

Differential Scanning Calorimetry (DSC): Glass transition temperature (Tg) of a polymer is measured by DSC. 5-10 milligram (mg) of a sample is analyzed in a crimped aluminum pan on a TA Instrument DSC Q2000 fitted with an auto-sampler under nitrogen. Tg measurement by DSC is conducted for 3 cycles: $1^{st}$ cycle: from −60° C. to 160° C., 10 degree Celsius per minute (° C./min), and hold for 3 minutes (min); $2^{nd}$ cycle: from 160° C. to −60° C., 10° C./min, hold for 3 min; and $3^{rd}$ cycle: from −60° C. to 160° C., 10° C./min, and hold for 3 min. Tg is obtained from the $3^{rd}$ cycle by the half height method.

Gel Permeation Chromatography (GPC): Molecular weight of a polymer is measured by GPC analysis using Agilent 1200. The sample is dissolved in tetrahydrofuran (THF)/formic acid (FA) (5%) with a concentration of 2 mg/mL and then filtered through 0.45 μm polytetrafluoroethylene (PTFE) filter prior to the GPC analysis. The GPC analysis is conducted using the following conditions:

Column: One PLgel GUARD columns (10 μm, 50×7.5 mm), One Mixed B columns (7.8×300 mm) in tandem; column temperature: 40° C.; mobile phase: THF/FA (5%); flow rate: 1.0 mL/minute; injection volume: 100 μL; detector: Agilent Refractive Index detector, 40° C.; and calibration curve: PL Polystyrene Narrow standards with molecular weights ranging from 2329000 to 580 g/mol, using polynom 3 fitness.

CEF: Comonomer distribution analysis is performed with Crystallization Elution Fractionation (CEF) (PolymerChar, Spain) (Monrabal et al, Macromol. Symp. 257, 71-79 (2007)) equipped with IR-4 detector (PolymerChar, Spain) and two angle light scattering detector Model 2040 (Precision Detectors, currently Agilent Technologies). IR-4 or IR-5 detector is used. A 10 or 20 micron guard column of 50×4.6 mm (PolymerLab, currently Agilent Technologies) is installed just before the IR-4 detector or IR-5 detector in the detector oven. Ortho-dichlorobenzene (ODCB, 99% anhydrous grade) and 2,5-di-tert-butyl-4-methylphenol ("BHT", catalogue number B 1378-500G, batch number 098K0686) from Sigma-Aldrich are obtained. ODCB is distilled before use. Silica gel 40 (particle size 0.2-0.5 mm, catalogue number 10181-3) from EMD Chemicals is also obtained. The silica gel is dried in a vacuum oven at 160° C. for about two hours before use. Eight hundred milligrams of BHT and five grams of the silica gel are added to two liters of ODCB. ODCB can be also dried by passing through a column or columns packed with silica gel. For the CEF instrument equipped with an autosampler with N2 purging capability, Silica gel 40 is packed into two 300×7.5 mm GPC size stainless steel columns and the Silica gel 40 columns are installed at the inlet of the pump of the CEF instrument to dry ODCB; and no BHT is added to the mobile phase. This "ODCB containing BHT and silica gel" or ODCB dried with silica gel 40 is now referred to as "ODCB." This ODBC is sparged with dried nitrogen (N2) for one hour before use. Dried nitrogen is such that is obtained by passing nitrogen at <90 psig over $CaCO_3$ and 5 Å molecular sieves. The resulting nitrogen should have a dew point of approximately −73° C. Sample preparation is done with autosampler at 4 mg/ml (unless otherwise specified) under shaking at 160° C. for 2 hours. The injection volume is 300 μl. The temperature profile of CEF is: crystallization at 3° C./min from 110° C. to 30° C., the thermal equilibrium at 30° C. for 5 minutes (including Soluble Fraction Elution Time being set as 2 minutes), elution at 3° C./min from 30° C. to 140° C. The flow rate during crystallization is 0.052 ml/min. The flow rate during cooling step is 0.052 mL/min. The flow rate during elution is 0.50 ml/min. The data is collected at one data point/second. The CEF column is packed with glass beads at 125 μm±6% (MO-SCI Specialty Products) with ⅛ inch stainless tubing according to U.S. Pat. No. 8,372,931.

The column outside diameter (OD) is ⅛ inch. The critical parameters needed to duplicate the method include the column internal diameter (ID), and column length (L). The choice of ID and L must be such that when packed with the 125 μm diameter glass beads, the liquid internal volume is 2.1 to 2.3 mL. If L is 152 cm, then ID must be 0.206 cm and the wall thickness must be 0.056 cm. Different values for L and ID can be used, as long as the glass bead diameter is 125 μm and the internal liquid volume is between 2.1 and 2.3 mL. Column temperature calibration is performed by using a mixture of NIST Standard Reference Material Linear polyethylene 1475a (1.0 mg/ml) and Eicosane (2 mg/ml) in ODCB. CEF temperature calibration consists of four steps: (1) Calculating the delay volume defined as the temperature offset between the measured peak elution temperature of Eicosane minus 30.00° C.; (2) Subtracting the temperature offset of the elution temperature from CEF raw temperature data. It is noted that this temperature offset is a function of experimental conditions, such as elution temperature, elution flow rate, etc.; (3) Creating a linear calibration line transforming the elution temperature across a range of 30.00° C. and 140.00° C. so that NIST linear polyethylene 1475a has a peak temperature at 101.0° C., and Eicosane has a peak temperature of 30.0° C.; (4) For the soluble fraction measured isothermally at 30° C., the elution temperature is extrapolated linearly by using the elution heating rate of 3° C./min. The reported elution peak temperatures are obtained such that the observed comonomer content calibration curve agrees with those previously reported in U.S. Pat. No. 8,372,931.

2. Materials

The materials used in the examples are provided in Table 1 below.

650.00 g $H_2O$ is charged into a kettle under mechanical agitation. Then, kettle soap (FES 32: 3.42 g), $Na_2CO_3$ (2.65 g), ME seed (67.09 g extracted from the ME prepared above), and kettle initiator (3.83 g ammonium persulfate (APS) solid in 16.65 g deionized (DI) water) are charged into the kettle. After reaching a bottom temperature, an exotherm of 6-8° C. during 3-5 minutes is observed. After the exotherm peak is observed, a ME feed and a co-feed (containing (i) 1.53 g APS in 53.11 g DI water; and (ii) 1.59 g sodium metabisulfite (NaBS) in 53.11 g DI water) is started into the kettle—each feed lasts for 120 minutes at temperature of 90° C. After a holding for 15 minutes, the temperature is lowered to 80° C. and the first step chasers (1.04 g tert-Butyl hydroperoxide (t-BHP) in 9.47 g DI water, and 0.47 g isoascorbic acid (IAA) in 9.47 g DI water) are shot into the reactor sequentially. Another holding of 10 minutes is carried out before a further temperature decrease to 65° C. At the end of feed, the reactor is cooled to room temperature (23° C.). The resulting emulsion has a pH of 7.42.

The resultant emulsion is added into a Mini Spray Dryer B-290, available from BUCHI Corporation, and the device is set so that the nozzle diameter is 1 mm, the temperature of air inlet is 170° C., the temperature of air outlet is 105° C., the pump speed is 0.45 L per hour, and the air pressure is about 196 kPa. Polymer powders are collected from the product collection vessel of the spray dryer. The collected polymer powder is polystyrene comprising an acetoacetoxyethyl methacrylate (AAEM) group.

The glass transition temperature (Tg) of the polystyrene polymer comprising an AAEM group is measured to be 90° C.

TABLE 1

| Material | Description/Properties | Source |
|---|---|---|
| YUPLENE ™ BX3900 | polpropylene impact copolymer density = 0.90 g/cm³ (ASTM D792) MFR = 60 g/10 min (ASTM D1238, 230° C./2.16 kg) | SK Global Chemical |
| ENGAGE ™ 8200 | polyolefin elastomer ethylene/octene copolymer density = 0.870 g/cm³ (ASTM D792) MI = 5 g/10 min (ASTM D792, 190° C./2.16 kg) | The Dow Chemical Company |
| Kraton ™ G1657 | styrene ethylene/butylene styrene (SEBS) block copolymer density = 0.88 g/cm³ MFR = 22 g/10 min (230° C./5.00 kg) | Kraton Performance Polymers, Inc. |
| AMPLIFY ™ EA 101 | ethylene-ethyl acrylate (EEA) copolymer 18.5 wt % ethyl acrylate density = 0.931 g/cm³ MI = 6.0 g/10 min (190° C./2.16 kg) | The Dow Chemical Company |
| JetFil ™ 700 | talc | IMERYS |
| IRGANOX ™ B 225 | Antioxidant containing a blend of 50 wt % tris(2,4-ditert-butylphenyl)phosphite and 50 wt % pentaerythritol tetrakis[3-[3,5-di-tert-butyl-4-hydroxyphenyl]propionate] | BASF |

3. Protocols a. Preparation of the Polymer Comprising an Acetoacetyl Functional Group A monomer emulsion (ME) containing 379.00 g $H_2O$, 46.20 g DISPONIL™ FES 32 (a surfactant available from BASF), 159.14 g methyl methacrylate (MMA), 21.54 g acrylic acid (AA), 29.85 g butyl acrylate (BA), 790.35 g styrene, and 63.65 g acetoacetoxyethyl methacrylate (AAEM) is prepared under magnetic stirring.

b. Preparation of the Block Composite (BC)

The block composite used in the examples herein (BC) is prepared using two continuous stirred tank reactors (CSTR) connected in series. Each reactor is hydraulically full and set to operate at steady state conditions. The block composite is prepared by flowing monomers, solvent, catalyst, cocatalyst, and CSA to the first reactor according to the process conditions outlined in Table 2A. Then, the first reactor contents as described in Table 2A are flowed to the second reactor in the series. Additional catalyst and cocatalyst are added to the second reactor, as well as a small amount of MMAO as a scavenger. The block composite is prepared by controlling the conditions of the two reactors as described in Table 2A.

The Catalyst is ([[rel-2',2'''-[(1R,2R)-1,2-cylcohexanediylbis(methyleneoxy-κO)]bis[3-(9H-carbazol-9-yl)-5-methyl[1,1'-biphenyl]-2-olato-κO]](2-)]dimethyl-hafnium).

The Cocatalyst-1 is a mixture of methyldi($C_{14-18}$ alkyl) ammonium salts of tetrakis(pentafluorophenyl)borate, prepared by reaction of a long chain trialkylamine (Armeen™ M2HT, available from Akzo-Nobel, Inc.), HCl and Li[B($C_6F_5$)$_4$], substantially as disclosed in U.S. Pat. No. 5,919,9883, Ex. 2., which are purchased from Boulder Scientific and used without further purification.

CSA-1 (diethylzinc or DEZ) and Cocatalyst-2 (modified methylalumoxane (MMAO)) are purchased from Akzo Nobel and used without further purification.

The Solvent is a hydrocarbon mixture (ISOPAR®E) obtainable from ExxonMobil Chemical Company and purified through beds of 13-X molecular sieves prior to use.

TABLE 2A

|  | First Reactor Process Conditions | Second Reactor Process Conditions |
| --- | --- | --- |
| Reactor Control Temperature (° C.) | 105 | 115 |
| Solvent Feed (lb/hr) | 335 | 564 |
| Propylene Feed (lb/hr) | 28.18 | 73.84 |
| Ethylene Feed (lb/hr) | 51.7 | 0 |
| Hydrogen Feed (SCCM) | 67.74 | 0 |
| Reactor Ethylene Concentration (g/L) | 4.14 | 1.96 |
| Reactor Propylene Concentration (g/L) | 1.97 | 2.69 |
| Catalyst Efficiency (gPoly/gM)*1.0E6 | 2.68 | 0.23 |
| Catalyst Flow (lb/hr) | 0.29 | 3.26 |
| Catalyst Concentration (ppm) | 99.98 | 99.98 |
| Cocatalyst-1 Flow (lb/hr) | 0.27 | 3.0 |
| Cocatalyst-1 Concentration (ppm) | 1995 | 1995 |
| Cocatalyst-2 Flow (lb/hr) | 0.34 | 1.86 |
| Cocatalyst-2 Concentration (ppm) | 995 | 494 |
| DEZ Flow (lb/hr) | 1.6 | 0 |
| DEZ Concentration (ppm) | 37503 | 0 |

The resultant BC is an ethylene-propylene/isotactic polypropylene (E-P/iPP) based block composite that includes 50 wt % of ethylene-propylene (having an ethylene content of 65 wt %) and 50 wt % of isotactic polypropylene (having an ethylene content of 1 wt %). The properties of the block composite (BC) are provided in Table 2B.

TABLE 2B

| Block Composite (BC) Properties | |
| --- | --- |
| Melt Flow Rate (MFR) (230° C./2.16 kg) | 6.5 g/10 min |
| Melt Temperature (Tm) | 33° C. (peak 1); 137° C. (peak 2) |
| Crystallization Temperature (Tc) | 96° C. |
| Glass Transition Temperature (Tg) | −52° C. |
| Heat of Fusion ($H_f$) | 52 J/g |
| Mw | 130 Kg/mol |
| Mw/Mn | 2.98 |
| Density | 0.879 g/cm$^3$ |
| Total wt % C2 (NMR) | 35.5 |
| Block Composite Index (BCI) | 0.482 |

Block Composite Index Calculations:

The term Block Composite Index (BCI) is herein defined to equal the weight percentage of the block copolymer divided by 100% (i.e., weight fraction). The value of the BCI can range from 0 up to 1.0, where 1.0 would be equal to 100% of the block copolymer and zero would be for material such as a traditional blend or random copolymer. Said in another way, for an insoluble fraction, the BCI is 1.0, and for a soluble fraction, the BCI is assigned a value of zero. The following is a description for estimating the block composite index.

Estimation of Block Composite Index is based on showing that the insoluble fractions contain an appreciable amount of ethylene that would not otherwise be present if the polymer was simply a blend of iPP homopolymer and EP copolymer. To account for this "extra ethylene", a mass balance calculation can be performed to estimate a block composite index from the amount of xylene insoluble and soluble fractions and the weight % ethylene present in each of the fractions.

A summation of the weight % ethylene from each fraction according to equation 1 results in an overall weight % ethylene (in the polymer). This mass balance equation can also be used to quantify the amount of each component in a binary blend or extended to a ternary, or n-component blend.

$$Wt\%C_{2_{Overall}} = w_{Insoluble}(\text{wt }\%C_{2_{Insoluble}}) + w_{soluble}(\text{wt }\%C_{2_{soluble}}) \qquad \text{Eq. 1}$$

$$Wt\%C_{2_{Overall}} = w_{iPPHard}(\text{wt }\%C_{2_{iPP}}) + w_{EP\,soft}(\text{wt }\%C_{2_{EPsoft}}) \qquad \text{Eq. 2}$$

Applying equations 2 through 4, the amount of the soft block (providing the source of the extra ethylene) present in the insoluble fraction is calculated. By substituting the weight % $C_2$ of the insoluble fraction in the left hand side of equation 2, the weight % iPP hard and weight % EP soft can be calculated using equations 3 and 4. Note that the weight % of ethylene in the EP soft is set to be equal to the weight % ethylene in the xylene soluble fraction. The weight % ethylene in the iPP block is set to zero or if otherwise known from its DSC melting point or other composition measurement, the value can be put into its place.

$$w_{iPPhard} = \frac{\text{wt }\% C_{2_{xyleneinsoluble}} - \text{wt }\% C_{2_{EPsoft}}}{\text{wt }\% C_{2_{iPPhard}} - \text{wt }\% C_{2_{EPsoft}}} \qquad \text{Eq. 3}$$

$$w_{EPsoft} = 1 - w_{iPPHard} \qquad \text{Eq. 4}$$

After accounting for the 'additional' ethylene present in the insoluble fraction, the only way to have an EP copolymer present in the insoluble fraction, the EP polymer chain must be connected to an iPP polymer block (or else it would have been extracted into the xylene soluble fraction). Thus, when the iPP block crystallizes, it prevents the EP block from solubilizing.

To estimate the block composite index, the relative amount of each block must be taken into account. To approximate this, the ratio between the EP soft and iPP hard is used. The ratio of the EP soft polymer and iPP hard polymer can be calculated using Equation 2 from the mass balance of the total ethylene measured in the polymer. Alternatively it could also be estimated from a mass balance of the monomer and comonomer consumption during the polymerization. The weight fraction of iPP hard and weight fraction of EP soft is calculated using Equation 2 and assumes the iPP hard contains no ethylene. The weight % ethylene of the EP soft is the amount of ethylene present in the xylene soluble fraction.

The BCI calculations for the block composite (BC) of the examples are provided in Table 3, below.

TABLE 3

| Line # | Variable | Source | BC |
|---|---|---|---|
| 1 | Overall wt % C2 Total | Measured | 35.5 |
| 2 | wt % C2 in PP block/polymer | Measured | 0.5 |
| 3 | wt % C2 in EP block/polymer | Measured | 65 |
| 4 | wt fraction iPP (in block or polymer) | Calc. | 0.457 |
| 5 | wt fraction EP (in block or polymer) | Calc. | 0.543 |
| 6 | Analysis of HTLC Separation | — | |
| 7 | wt fraction xylene soluble | Measured | 0.281* |
| 8 | wt fraction xylene insoluble | Measured | 0.719* |
| 9 | wt % C2 in xylene insoluble | Measured | 24.0** |
| 10 | wt fraction PP in insoluble | Calc. | 0.636 |
| 11 | wt fraction EP in insoluble fraction | 1-Line 10 | 0.364 |
| 12 | wt fraction Diblock in insoluble fraction | Line 11/Line 5 | 0.671 |
| 13 | Block Composite Index (BCI) | Calc | 0.482 |

*Estimated from CEF
**Estimated mass balance c. Examples 1-13 and Comparative Sample 1

The comparative sample and examples are each prepared by weighing each component into a Coperon™ 18 mm extruder and extruding the composition. After extrusion, the composition is granulated into small pellets using a side cutter granulator manufactured by LABTECH Engineering company, Model: LSC-108. Pellets have a diameter of 2.3-3.0 mm and a length of 2.3-3.0 mm. The pellets are then molded into samples for testing. Table 3 shows the amount, in weight percent, of each component included in the example and comparative sample compositions.

The pellets are tested for Volatile Organic Chemicals (VOC) in accordance with the VOC Test Method. The results are shown in Table 4.

The pellets are also tested for mechanical properties. The results are shown in Table 4.

TABLE 4

| | CS 1 | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|---|---|---|---|---|
| | | | | | | Components in phr | | | | | | | | |
| YUPLENE™ BX3900 (phr) | 75 | 75 | 75 | 75 | 75 | 75 | 75 | 75 | 75 | 75 | 75 | 75 | 75 | 75 |
| ENGAGE™ 8200 (phr) | 25 | 25 | 25 | 25 | 25 | 25 | 25 | 25 | 25 | 25 | 25 | 25 | 25 | 25 |
| Polystyrene comprising AAEM group (phr) | — | 2.5 | 2.5 | 1.0 | 1.0 | 2.0 | 1.0 | 0.5 | 1.0 | 1.0 | 1.0 | 1.0 | 2.0 | 1.0 |
| Kraton™ G1657 (phr) | — | — | 0.66 | — | 0.264 | 0.264 | 0.528 | 0.132 | 0.264 | — | — | — | — | — |
| AMPLIFY™ EA 101 (phr) | — | — | — | — | — | — | — | — | — | — | — | 0.264 | 0.264 | 0.528 |
| BC (phr) | — | — | — | — | — | — | — | — | 2.5 | 2.5 | 5.0 | — | — | — |
| JetFil™ 700 (phr) | 20 | 20 | 20 | 20 | 20 | 20 | 20 | 20 | 20 | 20 | 20 | 20 | 20 | 20 |
| IRGANOX™ B 225 (phr) | 0.3 | 0.3 | 0.3 | 0.3 | 0.3 | 0.3 | 0.3 | 0.3 | 0.3 | 0.3 | 0.3 | 0.3 | 0.3 | 0.3 |
| | | | | | | Components in Weight Percent | | | | | | | | |
| YUPLENE™ BX3900 (wt %) | 62.34 | 61.07 | 60.75 | 61.83 | 61.70 | 61.19 | 61.56 | 62.02 | 60.45 | 60.58 | 59.38 | 61.70 | 61.19 | 61.56 |
| ENGAGE™ 8200 (wt %) | 20.78 | 20.36 | 20.25 | 20.61 | 20.57 | 20.40 | 20.52 | 20.67 | 20.15 | 20.19 | 19.79 | 20.57 | 20.40 | 20.52 |
| Polystyrene comprising AAEM group (wt %) | — | 2.04 | 2.02 | 0.82 | 0.82 | 1.63 | 0.82 | 0.41 | 0.81 | 0.81 | 0.79 | 0.82 | 1.63 | 0.82 |
| Kraton™ G1657 (wt %) | — | — | 0.53 | — | 0.22 | 0.22 | 0.43 | 0.11 | 0.21 | — | — | — | — | — |
| AMPLIFY™ EA 101 (wt %) | — | — | — | — | — | — | — | — | — | — | — | 0.22 | 0.22 | 0.43 |
| BC (wt %) | — | — | — | — | — | — | — | — | 2.02 | 2.02 | 3.96 | — | — | — |
| JetFil™ 700 (wt %) | 16.63 | 16.29 | 16.20 | 16.49 | 16.45 | 16.32 | 16.42 | 16.54 | 16.12 | 16.16 | 15.84 | 16.45 | 16.32 | 16.42 |
| IRGANOX™ B 225 (wt %) | 0.25 | 0.24 | 0.24 | 0.25 | 0.25 | 0.24 | 0.25 | 0.25 | 0.24 | 0.24 | 0.24 | 0.25 | 0.24 | 0.25 |
| | | | | | | Aldehyde VOC Concentrations | | | | | | | | |
| Formaldehyde (mg/m$^3$) | 0.38 | 0.01 | ND | 0.02 | 0.02 | ND | 0.01 | 0.01 | 0.01 | ND | ND | ND | ND | ND |
| Acetaldehyde (mg/m$^3$) | 4.00 | 3.26 | 1.65 | 1.26 | 2.64 | 1.06 | 3.93 | 2.0 | 2.33 | 2.88 | 1.7 | 2.26 | 2.74 | 2.47 |
| Acrolein (mg/m$^3$) | 0.08 | ND | ND | ND | ND | ND | ND | ND | ND | ND | ND | ND | ND | ND |

TABLE 4-continued

|  | CS 1 | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|---|---|---|---|---|
| Propionaldehyde (mg/m$^3$) | 1.20 | 0.59 | 0.30 | 0.19 | 0.33 | 0.14 | 0.31 | 0.20 | 0.19 | 0.17 | 0.12 | 0.21 | 0.23 | 0.21 |
| Crotonaldehyde (mg/m$^3$) | 0.06 | 0.03 | ND | ND | ND | ND | ND | ND | ND | ND | ND | ND | ND | ND |
| Mechanical Properties | | | | | | | | | | | | | | |
| Flexural Modulus (MPa) | 1780 | 1619 | 1483 | 1757 | 1720 | 1643 | 1649 | 1773 | 1672 | 1643 | 1714 | 1696 | 1698 | 1721 |
| Flexural Yield Strength (MPa) | 30.0 | 31.2 | 29.3 | 31.9 | 31.5 | 30.8 | 30.4 | 31.8 | 31.1 | 30.5 | 32.0 | 32.2 | 31.9 | 31.5 |
| Tensile Modulus (MPa) | 1590 | 1490 | 1280 | 1480 | 1490 | 1520 | 1420 | 1630 | 1430 | 1400 | 1420 | 1330 | 1330 | 1530 |
| Tensile Yield Strength (MPa) | 21.5 | 20.8 | 20.2 | 21.3 | 21.1 | 20.9 | 20.8 | 21.4 | 20.9 | 20.5 | 21.3 | 21.0 | 21.0 | 21.2 |
| Notched IZOD @ 23° C. (kJ/m$^2$) | 28.50 | 28.6 | 38.0 | 32.6 | 34.2 | 29.9 | 31.2 | 35.6 | 28.7 | 30.8 | 26.0 | 24.2 | 27.7 | 33.6 |
| Notched IZOD @ −30° C. (kJ/m$^2$) | 5.11 | 4.51 | 5.45 | 4.51 | 5.64 | 4.27 | 4.65 | 5.66 | 4.37 | 4.38 | 4.38 | 3.85 | 4.23 | 4.61 |
| Elongation (%) | 91.7 | 97.6 | 134.5 | 64.2 | 96 | 102.3 | 111.6 | 178.8 | 88.5 | 88.7 | 73.3 | 63.5 | 91.2 | 84.2 |

CS = Comparative Sample.
ND = Not Detectable. A sample with an aldehyde content that is not detectable has an aldehyde content that is less than the detection limit of 0.01 mg/m$^3$ (i.e., from 0 mg/m$^3$ to less than 0.01 mg/m$^3$).

4. Results

As shown, Examples 1-13, which are compositions containing (A) polypropylene (YUPLENE™ BX3900); (B) polyolefin elastomer (ENGAGE™ 8200); (C) polystyrene comprising an acetoacetoxyethyl methacrylate (AAEM) group; (D) a compatibilizer such as SEBS copolymer (Kraton™ G1657), EEA copolymer (AMPLIFY™ EA 101), and/or a block composite (BC); and (E) additives including talc (JetFil™ 700) and an antioxidant (IRGANOX™ B 225), advantageously exhibit reduced aldehyde concentrations compared to CS 1, which lacks a polymer with an acetoacetyl functional group and is representative of the state of the art.

Without wishing to be bound by any particular theory, Applicant believes the acetoacetyl group reacts with aldehydes (e.g., formaldehyde, acetaldehyde, acrolein, propionaldehyde, and crotonaldehyde) present in the composition, which advantageously abates (i.e., reduces) the aldehyde concentration of the composition.

Furthermore, Examples 1-13 surprisingly and unexpectedly exhibit similar, and in some cases improved, mechanical properties compared to CS 1, indicating Examples 1-13 are suitable for making articles such as automobile interior parts.

It is further noted that inventive compositions of the present disclosure are cost effective by limiting the amount of expensive components, such as acetoacetyl functional polymers.

It is specifically intended that the present disclosure not be limited to the embodiments and illustrations contained herein, but include modified forms of those embodiments including portions of the embodiments and combinations of elements of different embodiments as come within the scope of the following claims.

What is claimed is:

1. A composition comprising:
   (A) a polypropylene polymer;
   (B) a polyolefin elastomer;
   (C) a polymer comprising an acetoacetyl functional group; and
   (D) a compatibilizer component.

2. A composition comprising:
   (A) from 50 wt % to 85 wt % of a polypropylene polymer;
   (B) from 5 wt % to 35 wt % of a polyolefin elastomer;
   (C) from 0.2 wt % to 20 wt % of a polymer comprising an acetoacetyl functional; group; and
   (D) from 0.01 wt % to 10 wt % of a compatibilizer component.

3. The composition of claim 1 wherein the polyolefin elastomer is an ethylene/α-olefin copolymer.

4. The composition of claim 1 wherein the polymer comprising an acetoacetyl functional group comprises:
   a base polymer selected from the group consisting of an acrylic polymer, a polyethylene, a polypropylene, a polystyrene, a styrenic block copolymer, and combinations thereof; and
   an acetoacetyl-containing monomer selected from the group consisting of acetoacetoxyethyl methacrylate, acetoacetoxyethyl acrylate, acetoacetoxypropyl methacrylate, allyl acetoacetate, acetoacetoxybutyl methacrylate, 2,3-di(acetoacetoxy)propyl methacrylate, and mixtures thereof.

5. The composition of claim 4 wherein the base polymer is polystyrene and the acetoacetyl-containing monomer is acetoacetoxyethyl methacrylate.

6. The composition of claim 1 in which the compatibilizer component is selected from the group consisting of a styrenic block copolymer, an ethylene acrylic acid copolymer, an ethylene ethyl acrylate copolymer, a block composite, and combinations thereof.

7. The composition of claim 1 comprising equal to or less than 0.02 mg/m$^3$ formaldehyde, as measured in accordance with the VOC Test Method.

8. The composition of claim 1 comprising less than 4.0 mg/m$^3$ acetaldehyde, as measured in accordance with the VOC Test Method.

9. The composition of claim 1 comprising less than 0.01 mg/m$^3$ acrolein, as measured in accordance with the VOC Test Method.

10. The composition of claim 1 comprising:
- less than 0.10 mg/m$^3$ formaldehyde, as measured in accordance with the VOC Test Method;
- less than 4.0 mg/m$^3$ acetaldehyde, as measured in accordance with the VOC Test Method;
- less than 0.05 mg/m$^3$ acrolein, as measured in accordance with the VOC Test Method;
- less than 1.00 mg/m$^3$ propionaldehyde, as measured in accordance with the VOC Test Method; and
- less than 0.10 mg/m$^3$ crotonaldehyde, as measured in accordance with the VOC Test Method.

11. The composition of claim 1 comprising:
a flexural modulus (Young's modulus) of greater than 1450 Mpa; and a flexural yield strength of greater than 25 Mpa.

12. The composition of claim 1 comprising:
a tensile modulus of greater than 1250 MPa; and a tensile yield strength of greater than 20 MPa.

13. The composition of claim 1 comprising:
an impact strength at 23° C. of greater than 24 kJ/m$^2$; and an impact strength at −30° C. of greater than 4 kJ/m$^2$.

14. An article made from the composition of claim 1.

15. The article of claim 14 in the form of an automobile interior part.

* * * * *